United States Patent
Glugla

(10) Patent No.: US 11,066,978 B1
(45) Date of Patent: Jul. 20, 2021

(54) SYSTEMS AND METHODS FOR EXHAUST GAS RECIRCULATION WITH A PRE-CHAMBER

(71) Applicant: Ford Global Technologies, LLC, Dearborn, MI (US)

(72) Inventor: Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/838,788

(22) Filed: Apr. 2, 2020

(51) Int. Cl.
  *F02B 19/10* (2006.01)
  *F02B 19/12* (2006.01)
  *F02D 41/30* (2006.01)

(52) U.S. Cl.
  CPC ...... *F02B 19/1085* (2013.01); *F02B 19/1052* (2013.01); *F02B 19/12* (2013.01); *F02D 41/3094* (2013.01)

(58) Field of Classification Search
  CPC .. F02B 19/1085; F02B 19/1052; F02B 19/12; F02D 41/3094
  See application file for complete search history.

(56) References Cited

U.S. PATENT DOCUMENTS

| | | | |
|---|---|---|---|
| 9,353,674 B2 | 5/2016 | Bunce et al. | |
| 10,018,104 B2 | 7/2018 | Grover, Jr. et al. | |
| 10,337,397 B2 | 7/2019 | Shelby et al. | |
| 2005/0051130 A1* | 3/2005 | Lampard | F02D 15/04 123/261 |
| 2010/0101533 A1* | 4/2010 | Huschenbett | F02D 35/023 123/406.19 |
| 2011/0308495 A1* | 12/2011 | Furukawa | F02D 41/0027 123/253 |
| 2014/0196686 A1* | 7/2014 | Coldren | F02M 21/0275 123/299 |
| 2016/0160742 A1* | 6/2016 | Willi | F02M 21/0275 123/260 |
| 2018/0363539 A1* | 12/2018 | Shelby | F02B 19/108 |

* cited by examiner

*Primary Examiner* — Xiao En Mo

(74) *Attorney, Agent, or Firm* — Geoffrey Brumbaugh; McCoy Russell LLP

(57) ABSTRACT

Methods and systems are provided for operating a cylinder of an engine including a pre-chamber system. In one example, a method includes flowing gases from a pre-chamber to a cylinder of an engine prior to fueling the cylinder during a combustion cycle, adjusting a composition of the gases by adjusting at least one of an air injection amount to the pre-chamber and a fuel injection amount to the pre-chamber, and igniting an air-fuel mixture in the cylinder via a pre-chamber ignition event, the air-fuel mixture in the cylinder including the gas from the pre-chamber. In this way, combustion qualities in the cylinder may be adjusted in order to increase a performance and/or an efficiency of the cylinder.

20 Claims, 6 Drawing Sheets

SYSTEMS AND METHODS FOR EXHAUST GAS RECIRCULATION WITH A PRE-CHAMBER

FIELD

The present description relates generally to methods and systems for engines having pre-chamber systems.

BACKGROUND/SUMMARY

An internal combustion engine combusts an air-fuel mixture within cylinders to produce torque, which may be used to propel a vehicle. In some such engines, an ignition source is used to ignite the air-fuel mixture within each cylinder during a compression stroke. For example, in traditional spark-ignition engines, each cylinder includes a spark plug for directly igniting the air-fuel mixture within the cylinder. In other examples, the air-fuel mixture within the cylinder may be ignited by jets of hot gas and flame from a pre-combustion chamber, referred to herein as a "pre-chamber." The pre-chamber may be walled chamber located in the clearance volume of the cylinder, and may include a spark plug, an $O_2$ or air injector, and a fuel injector. During engine operation, a first air-fuel mixture is introduced into the pre-chamber, and a second air-fuel mixture is introduced into the cylinder. When ignition is requested, the spark plug in the pre-chamber actuates, igniting the first air-fuel mixture. As the first air-fuel mixture combusts, jets of flame and hot gas may exit the pre-chamber and enter the cylinder via one or more holes in the pre-chamber walls. These jets ignite the second air-fuel mixture in the cylinder to produce torque.

Pre-chamber ignition may offer performance and efficiency benefits over a spark-ignition engine in some situations. For example, a cylinder with pre-chamber ignition may operate with a higher (e.g., leaner) air-fuel ratio (AFR) than a similar cylinder of a spark-ignition engine, which may lead to lower fuel consumption in the cylinder with pre-chamber ignition. In other examples, a cylinder with pre-chamber ignition may produce more power than a cylinder ignited by a spark plug due to an increased burn rate in the cylinder, which may reduce an amount of time for knocking combustion to occur and thereby allow ignition timing to be advanced further toward maximum brake torque (MBT).

Further, gases that flow from the pre-chamber to the cylinder via the one or more holes in the pre-chamber walls may affect the AFR and/or dilution of the cylinder. For example, unburnt air or $O_2$ from the active pre-chamber may flow from the pre-chamber to the cylinder, leading to a higher (e.g., leaner) cylinder AFR. As another example, exhaust gas from the pre-chamber may dilute the air in the cylinder. As still another example, the exhaust gas from the pre-chamber may be fuel-rich, which may result in a lower (e.g., richer) cylinder AFR.

The inventors herein have advantageously identified that the flow of gases from the pre-chamber to the cylinder may be leveraged to quickly adjust internal exhaust gas recirculation (EGR) on a cylinder-by-cylinder basis. In one example, a method comprises flowing gases from a pre-chamber to a cylinder of an engine prior to fueling the cylinder during a combustion cycle; adjusting a composition of the gases by adjusting at least one of an air injection amount to the pre-chamber and a fuel injection amount to the pre-chamber; and igniting an air-fuel mixture in the cylinder via a pre-chamber ignition event, the air-fuel mixture in the cylinder including the gas from the pre-chamber.

As one example, the pre-chamber may be fluidically coupled to the cylinder via an opening in a wall of the pre-chamber. For example, a plurality of openings may fluidically couple the pre-chamber to the cylinder, such that gases may flow between the pre-chamber and the cylinder in response to a pressure differential between the pre-chamber and the cylinder. In particular, gases may flow out of the pre-chamber into the cylinder during a combustion cycle when a pressure in the pre-chamber exceeds a pressure in the cylinder. Further, the pre-chamber combustion event may be earlier in the combustion cycle than the pre-chamber ignition event, the combustion cycle beginning with an intake stroke of the cylinder. For example, the combustion cycle may begin with the intake stroke of the cylinder, and may further include a compression stroke of the cylinder, a power stroke of the cylinder, and an exhaust stroke of the cylinder. For example, adjusting the composition of the gases that flow from the pre-chamber into the cylinder may include determining a desired composition of the gases based on at least one of a temperature of the engine, engine load, a demanded amount of torque, and an amount of external exhaust gas recirculation (EGR) provided to the engine. For example, a controller of the engine may determine the desired composition of the gases by determining desired combustion qualities for the engine operating conditions. In some examples, adjusting the composition of the gases by adjusting at least one of the air injection amount to the pre-chamber and the fuel injection amount to the pre-chamber further includes determining a desired air-fuel ratio for a pre-chamber combustion event based on the desired composition of the gases, and the method further comprises: determining the air injection amount and the fuel injection amount based on the desired air-fuel ratio for the pre-chamber combustion event; and actuating a spark plug coupled to the pre-chamber after injecting the determined air injection amount to the pre-chamber and injecting the determined fuel injection amount to the pre-chamber and prior to fueling the cylinder. Thus, the composition of the gases may be adjusted by changing the desired air-fuel ratio for the pre-chamber combustion event by adjusting an air injection amount and a fuel injection amount.

As an example, the desired air-fuel ratio for the pre-chamber combustion event is stoichiometry responsive to the engine load being between a lower threshold load and an upper threshold load and the temperature of the engine being greater than a threshold temperature, the desired air-fuel ratio for the pre-chamber combustion event is lean responsive to the demanded amount of torque being greater than a threshold, and the desired air-fuel ratio is rich responsive to at least one of the amount of external EGR provided to the engine being greater than a threshold amount and the temperature of the engine being less than the threshold temperature. Thus, rich pre-chamber EGR, lean pre-chamber EGR, and stoichiometric pre-chamber EGR may be provided to the cylinder based on one or more operating conditions. For example, providing rich pre-chamber EGR may increase ignitibility in the cylinder, stoichiometric pre-chamber EGR may increase dilution in the cylinder, and lean pre-chamber EGR may increase an air-charge in the cylinder. Further, in some examples, the desired composition is unburnt air responsive to the demanded amount of torque being greater than a threshold, and adjusting the composition of the gases by adjusting at least one of the air injection amount to the pre-chamber and the fuel injection amount to the pre-chamber includes adjusting the fuel injection amount to zero. As another example, flowing the gas from the pre-chamber to the cylinder includes performing a purge air injection in the pre-chamber. Performing a purge air injection may purge combustion gases from the pre-chamber into the cylinder, and may increase an amount of oxygen in the pre-chamber and in the cylinder. For example, igniting the air-fuel mixture in the cylinder via the pre-chamber ignition event includes, after performing the purge air injection: providing an ignition air injection amount to the pre-chamber and an ignition fuel injection amount to the pre-chamber; fueling the cylinder; and actuating a spark plug coupled to the pre-chamber. As a result, cylinder efficiency may be increased.

In this way, pre-chamber EGR may be provided to a cylinder of an engine, with a composition of the pre-chamber EGR adjusted based on desired combustion qualities of the cylinder and a cylinder fuel amount, which may increase a combustion stability and a burn rate of the cylinder. In some examples, pre-chamber EGR may be provided in combination with external EGR to achieve the desired combustion qualities of the cylinder. Further, by compensating the fuel injection amount for the amount and composition of pre-chamber gases in the cylinder, the controller may prevent the cylinder from operating at a non-stoichiometric AFR, which may increase a fuel efficiency of the vehicle and decrease vehicle emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
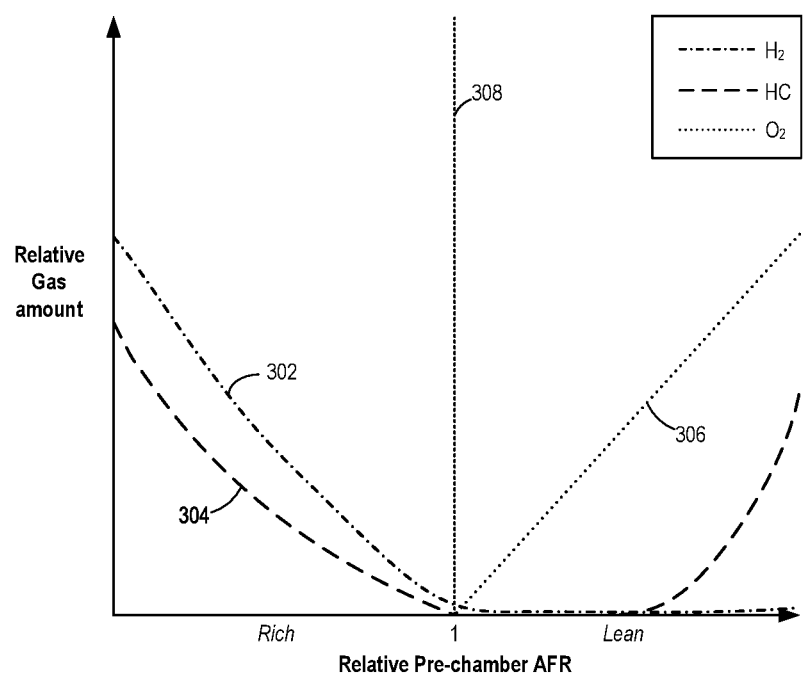
FIG. 3 shows an example graph of relative amounts of oxygen, hydrogen, and unburnt hydrocarbons in exhaust gas from a pre-chamber based on an air-fuel ratio of a pre-chamber combustion.
Figure 4:
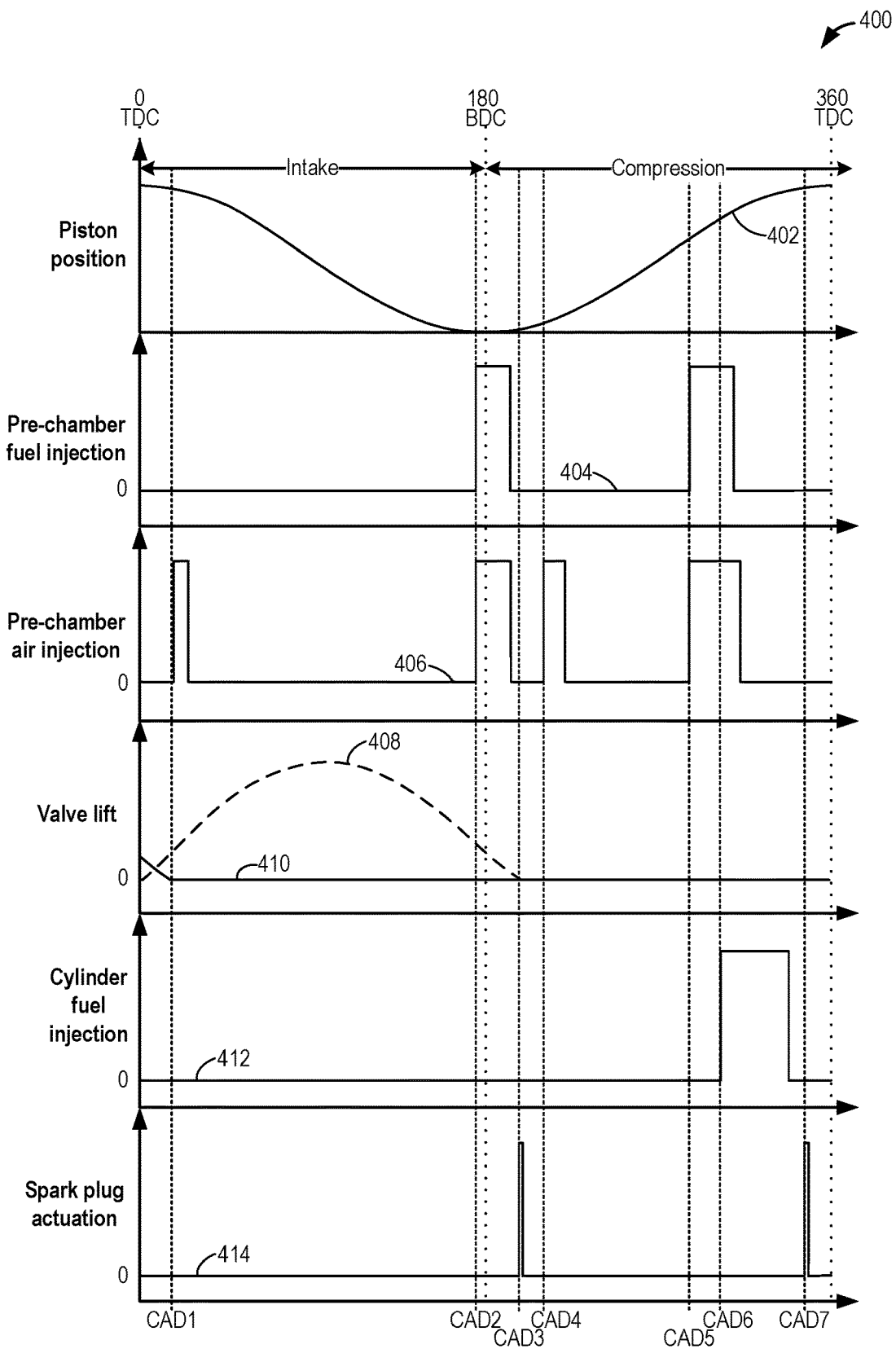
FIG. 4 shows an example timing chart for operating a pre-chamber to provide pre-chamber EGR and ignition to a cylinder.
Figure 5:
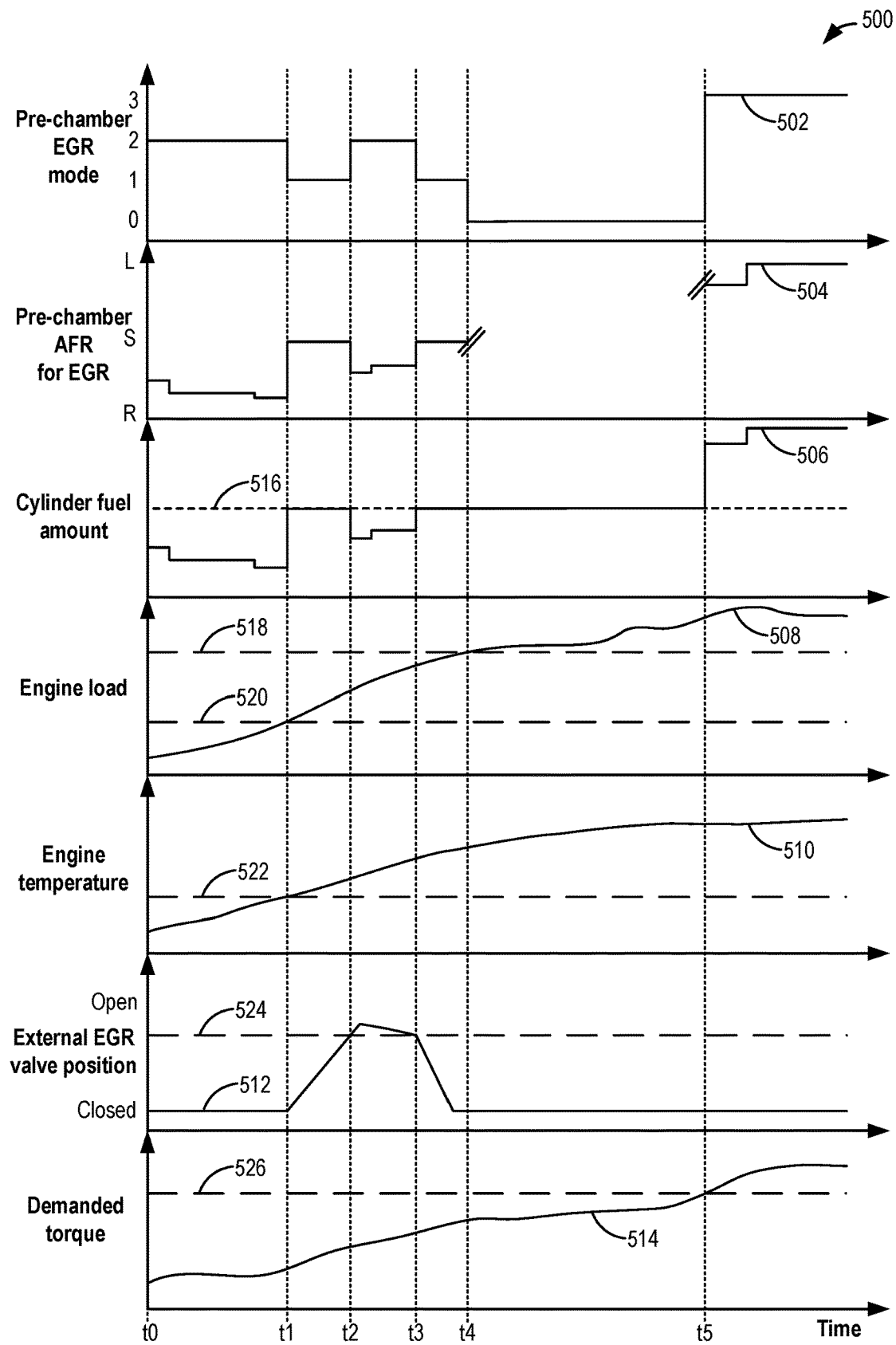
FIG. 5 shows a prophetic example timeline of operating a cylinder to provide pre-chamber EGR based on engine operating conditions.
Figure 6:
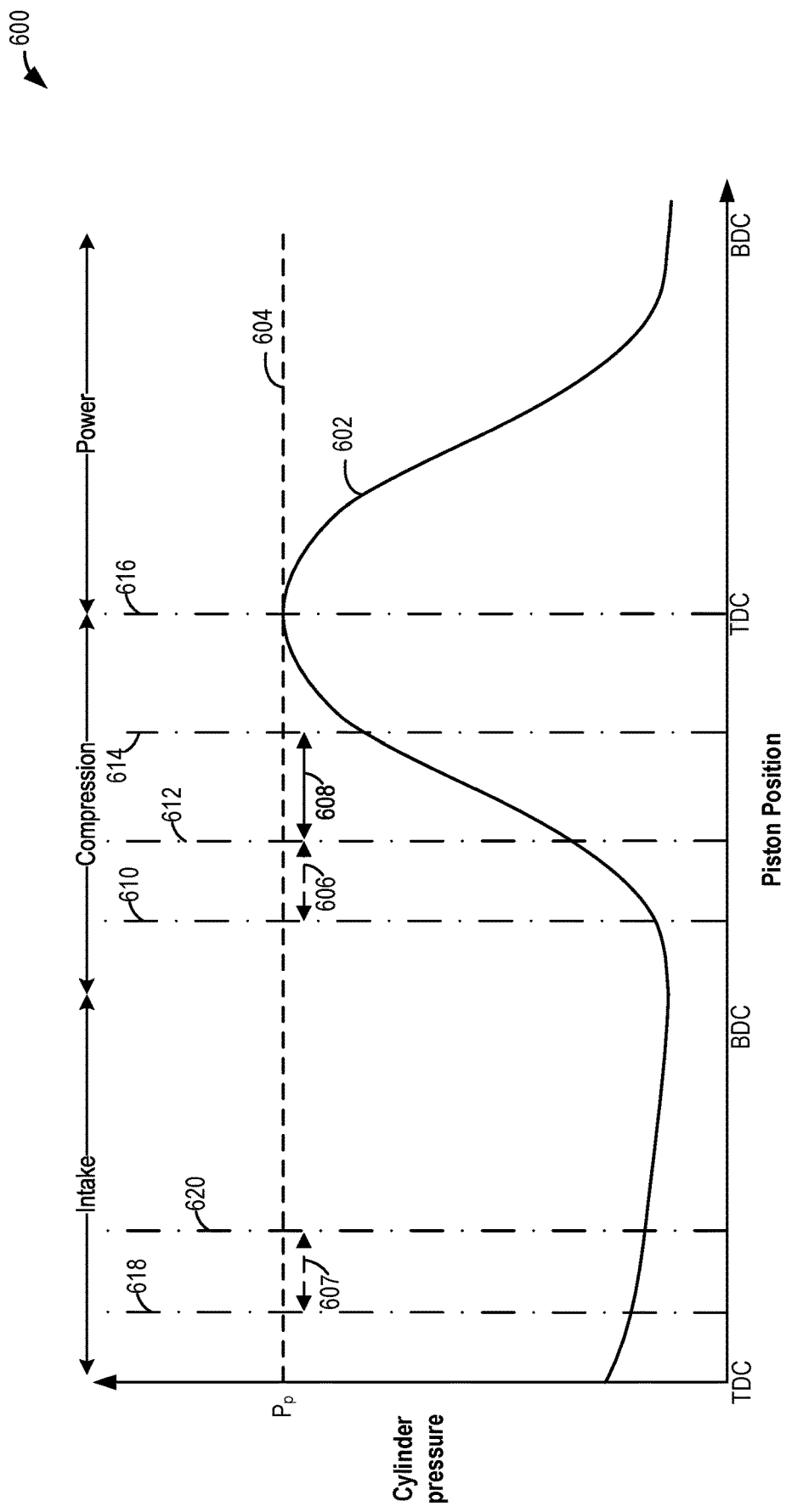
FIG. 6 shows an example graph of pressure in a cylinder relative to position of a piston.

The following description relates to systems and methods for an engine having an active pre-chamber. Each cylinder of the engine may have a cylinder configuration, such as the cylinder configuration shown in FIG. 1, including a fuel injector, a spark plug, and an air and/or $O_2$ injector in the pre-chamber. The pre-chamber may be operated to provide gases, such as pre-chamber exhaust gas recirculation (EGR), and/or an ignition source to the cylinder according to the method of FIG. 2. FIG. 3 shows an example graph of a relative composition of pre-chamber EGR at various combustion air-fuel ratios. Further, pre-chamber exhaust gas and air may enter the cylinder during the compression stroke of the cylinder even when an additional pre-chamber EGR event is not performed. Therefore, FIG. 6 shows an example graph of a characteristic relationship between pressure in the cylinder and a piston position within the cylinder, which may be used by the controller to determine pre-chamber injection pressures as well as to estimate gas flow from the pre-chamber to the cylinder. FIG. 4 shows an example timing chart for operating a pre-chamber to provide pre-chamber EGR and an ignition source to a cylinder, and FIG. 5 shows a prophetic example timeline for operating a cylinder to provide pre-chamber EGR based on engine operating conditions.

Figure 1:
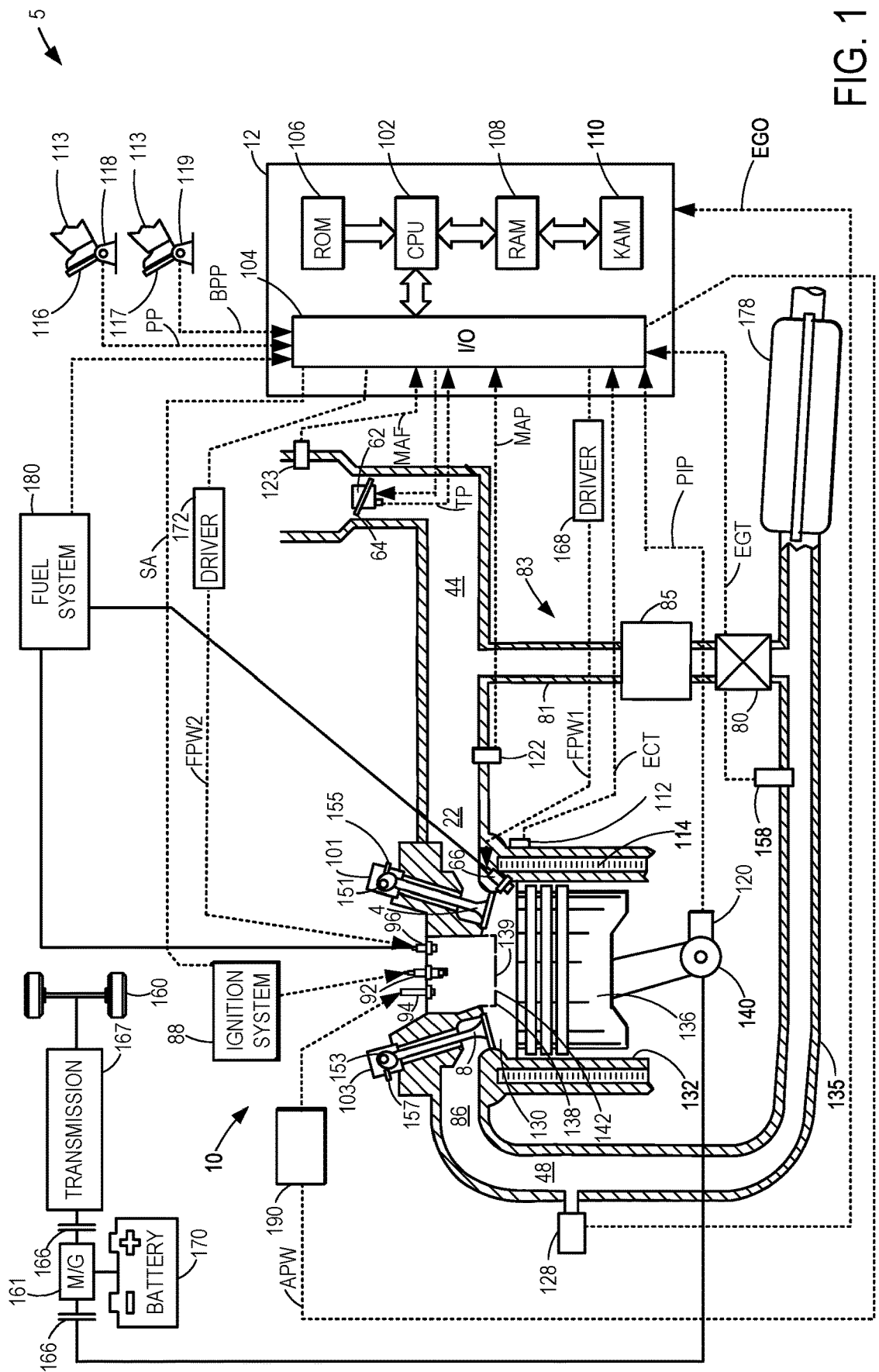
FIG. 1 shows a schematic depiction of a cylinder with a pre-chamber system in an engine of a vehicle system.

Turning now to the figures, FIG. 1 shows a partial view of a single cylinder 130 of an internal combustion engine 10 that may be included in a vehicle 5. Internal combustion engine 10 may be a multi-cylinder engine. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust manifold 48 via an exhaust valve 8 and an exhaust port 86. A throttle 62 including a throttle plate 64 may be provided in an intake passage upstream of intake manifold 44 for varying a flow rate and/or pressure of intake air provided to the engine cylinders.

An exhaust passage 135 can receive exhaust gases from other cylinders of engine 10 in addition to cylinder 130. An exhaust gas sensor 128 is shown coupled to exhaust passage 135 upstream of an emission control device 178. Exhaust gas sensor 128 may be selected from among various suitable sensors for providing an indication of an exhaust gas air-fuel ratio (AFR), such as a linear oxygen sensor or UEGO (universal or wide-range exhaust gas oxygen), a two-state oxygen sensor or EGO (as depicted), a HEGO (heated EGO), a NOx sensor, a HC sensor, or a CO sensor, for example. Emission control device 178 may be a three-way catalyst, a NOx trap, various other emission control devices, or combinations thereof.

External exhaust gas recirculation (EGR) may be provided to the engine via a high pressure EGR system 83, delivering exhaust gas from a zone of higher pressure in exhaust passage 135 to a zone of lower pressure in intake manifold 44, downstream of throttle 62, via an EGR passage 81. An amount EGR provided to intake manifold 44 may be varied by controller 12 via an EGR valve 80. For example, controller 12 may be configured to actuate and adjust a position of EGR valve 80 to adjust the amount of exhaust gas flowing through EGR passage 81. EGR valve 80 may be adjusted between a fully closed position, in which exhaust gas flow through EGR passage 81 is blocked, and a fully open position, in which exhaust gas flow through the EGR passage is enabled. As an example, EGR valve 80 may be continuously variable between the fully closed position and the fully open position. As such, the controller may increase a degree of opening of EGR valve 80 to increase an amount of EGR provided to intake manifold 44 and decrease the degree of opening of EGR valve 80 to decrease the amount of EGR provided to intake manifold 44. As an example, EGR valve 80 may be an electronically activated solenoid valve. In other examples, EGR valve 80 may be positioned by an incorporated stepper motor, which may be actuated by controller 12 to adjust the position of EGR valve 80 through a range of discreet steps (e.g., 52 steps), or EGR valve 80 may be another type of flow control valve. Further, EGR may be cooled via passing through EGR cooler 85 within EGR passage 81. EGR cooler 85 may reject heat from the EGR gases to engine coolant, for example.

Under some conditions, the EGR system may be used to regulate a temperature of the air and fuel mixture within the combustion chamber. Further, EGR may be desired to attain a desired engine dilution, thereby increasing fuel efficiency and emissions quality, such as emissions of nitrogen oxides. As an example, EGR may be requested at low-to-mid engine loads. Thus, it may be desirable to measure or estimate the EGR mass flow. EGR sensors may be arranged within EGR passage 81 and may provide an indication of one or more of mass flow, pressure, and temperature of the exhaust gas, for example. Additionally, EGR may be desired after emission control device 178 has attained its light-off temperature. An amount of EGR requested may be based on engine operating conditions, including engine load (as estimated via pedal position sensor 134), engine speed (as estimated via a crankshaft acceleration sensor), engine temperature (as estimated via an engine coolant temperature sensor), etc. For example, controller 12 may refer to a look-up table having the engine speed and load as the input and output a desired amount of EGR corresponding to the input engine speed-load. In another example, controller 12 may determine the desired amount of EGR (e.g., desired EGR flow rate) through logic rules that directly take into account parameters such as engine load, engine speed, engine temperature, etc. In still other examples, controller 12 may rely on a model that correlates a change in engine load with a change in a dilution requirement, and further correlates the change in the dilution requirement with a change in the amount of EGR requested. For example, as the engine load increases from a low load to a mid load, the amount of EGR requested may increase, and then as the engine load increases from a mid load to a high load, the amount of EGR requested may decrease. Controller 12 may further determine the amount of EGR requested by taking into account a best fuel economy mapping for a desired dilution rate. After determining the amount of EGR requested, controller 12 may refer to a look-up table having the requested amount of EGR as the input and a signal corresponding to a degree of opening to apply to the EGR valve (e.g., as sent to the stepper motor or other valve actuation device) as the output.

In the depicted view, intake valve 4 and exhaust valve 8 are located at an upper region of combustion chamber 130. Intake valve 4 and exhaust valve 8 may be controlled by a controller 12 using respective cam actuation systems including one or more cams. The cam actuation systems may utilize one or more of variable displacement engine (VDE), cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system. The various valve control systems may be used to vary a timing, open duration, and lift of intake valve 4 and exhaust valve 8.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

As a non-limiting example, cylinder 130 is shown including a cylinder fuel injector 66. Fuel injector 66 is shown coupled directly to combustion chamber 130 for injecting fuel directly therein in proportion to a pulse-width of a signal FPW1 received from controller 12 via an electronic driver 168. In this manner, fuel injector 66 provides what is known as direct injection (hereafter also referred to as "DI") of fuel into cylinder 130. In another example, injector 66 may be a port injector providing fuel into the intake port upstream of cylinder 130. Further, while FIG. 1 shows fuel injected to the cylinder via a single injector, the engine may alternatively be operated by injecting fuel via multiple injectors, such as one direct injector and one port injector. For example, both port and direct injectors may be included in a configuration that is known as port fuel and direct injection (PFDI). In such a configuration, controller 12 may vary a relative amount of injection from each injector.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In this way, air and fuel are delivered to cylinder 130, which may produce a combustible air-fuel mixture.

Fuel may be delivered by fuel injector 66 to cylinder 130 during a single cycle of the cylinder. Further, the distribution and/or relative amount of fuel delivered from cylinder fuel injector 66 may vary with operating conditions. Furthermore, for a single combustion event, multiple injections of the delivered fuel may be performed per cycle. The multiple injections may be performed during the compression stroke, intake stroke, or any appropriate combination thereof.

In the example shown in FIG. 1, each cylinder 130 of engine 10 includes a pre-chamber 138 for initiating combustion. Pre-chamber 138 is defined by pre-chamber walls 139 and includes a spark plug 92, an air injector 94, and a pre-chamber fuel injector 96. Air injector 94 is shown directly coupled to pre-chamber 138 for injecting air and/or oxygen into the pre-chamber. In some examples, air injector 94 is an electromagnetic (e.g., solenoid) injector. One or more of ambient air, oxygen, and another combustible gas may be delivered to air injector 94 from a pre-chamber air source 190. In some examples, air injector 94 is an electromagnetic (e.g., solenoid) injector, and may inject air and/or $O_2$ in proportion to a pulse-width of a signal APW received from controller 12 via pre-chamber air source 190. Note that in relation to pre-chamber air source 190, the term "air" may refer herein to ambient air, oxygen (e.g., $O_2$), hydrogen (e.g., $H_2$), or a mixture of such gases. In some examples, the pre-chamber air source 190 supplies air injector 94 with ambient air from an air intake passage of the engine, which may be stored in a pressurized tank before injection. In other examples, pre-chamber air source 190 supplies air injector 94 with onboard-generated $O_2$, which may be stored in a pressurized tank before injection. For example, the pressurized tank of pre-chamber air source 190 may be maintained at a desired pressure by an associated pump. A pressure differential between the pressurized tank and the pre-chamber and an open time of air injector 94 (e.g., as determined by the pulse-width of the signal APW) may determine the mass of air or $O_2$ delivered to pre-chamber 138, for example.

Pre-chamber fuel injector 96 is shown coupled directly to pre-chamber 138 for injecting fuel directly therein in proportion to a pulse-width of a signal FPW2 received from controller 12 via an electronic driver 172. Fuel may be provided to pre-chamber fuel injector 96 by high-pressure fuel system 180, described above. Alternatively, fuel may be provided to pre-chamber fuel injector 96 from a dedicated pre-chamber fuel system that may be included within or distinct from high-pressure fuel system 180. Thus, both air and fuel are delivered to pre-chamber 138, which may produce an air-fuel mixture with an air-fuel ratio (AFR) that may differ from an AFR in cylinder 130. In one example, the AFR in pre-chamber 138 may be richer (e.g., have a higher proportion of fuel) than the AFR in cylinder 130. In another example, the AFR in the pre-chamber may be the same as the AFR in the cylinder. In yet another example, the AFR in pre-chamber 138 may be leaner (e.g., have a higher proportion of air) than the AFR in cylinder 130.

Further, the pre-chamber walls 139 may include a plurality of openings, such as an opening 142 shown in FIG. 1. Opening 142 provides an orifice between pre-chamber 138 and cylinder 130, fluidically coupling an interior of pre-chamber 138 to an interior of cylinder 130. As such, during some conditions, gases may flow between the interior of pre-chamber 138 and the interior of cylinder 130. For example, gases (e.g., air, fuel, and/or residual combustion gases) may flow through opening 142 with a directionality and rate based on a pressure difference across opening 142 (e.g., between the interior of pre-chamber 138 and the interior of cylinder 130). Opening 142 (along with any other openings in pre-chamber walls 139) may also provide an ignition flame from pre-chamber 138 to cylinder 130, as will be elaborated below.

An ignition system 88 may provide an ignition spark to pre-chamber 138 via spark plug 92 in response to a spark advance signal SA from controller 12, under select operating modes. A timing of signal SA may be adjusted based on engine operating conditions and a driver torque demand. For example, spark may be provided at maximum brake torque (MBT) timing to maximize engine power and efficiency. Controller 12 may input engine operating conditions, including engine speed, engine load, and exhaust gas AFR, into a look-up table, which may output the corresponding MBT timing for the input engine operating conditions. In other examples, spark may be retarded from MBT to prevent an occurrence of knock. In still other examples, spark may be retarded from MBT to reduce engine torque, such as due to a decrease in driver-demanded torque or a transmission gear shift event. When spark plug 92 provides the ignition spark to pre-chamber 138, the air-fuel mixture within the pre-chamber may combust, the increased pressure of combustion sending jets of flame into cylinder 130 via the plurality of openings in the pre-chamber walls 139, including opening 142. The plurality of openings may be arranged such that the jets of flame are evenly distributed in cylinder 130. The jets of flame may ignite the air-fuel mixture in cylinder 130, causing combustion. After combustion, a mixture of exhaust gases from both pre-chamber 138 and cylinder 130 may be exhausted from cylinder 130 to exhaust manifold 48 via opening of exhaust valve 8.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read-only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed.

Controller 12 may receive various signals from sensors coupled to engine 10, in addition to those signals previously discussed, including a measurement of inducted mass air flow (MAF) from a mass air flow sensor 123, an engine coolant temperature signal (ECT) from a temperature sensor 112 coupled to coolant sleeve 114, signal EGO from exhaust gas sensor 128, which may be used by controller 12 to determine the AFR of the exhaust gas, an exhaust gas temperature signal (EGT) from a temperature sensor 158 coupled to exhaust passage 135, a profile ignition pickup signal (PIP) from a Hall effect sensor 120 (or other type) coupled to crankshaft 140, a throttle position (TP) from a throttle position sensor coupled to throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as cylinder fuel injector 66, throttle 62, spark plug 92, pre-chamber fuel injector 96, pre-chamber air injector 94, the intake/exhaust valves and cams, etc. The controller may receive input data from the various sensors, process the input data, and trigger the actuators in response to the processed input data based on instruction or code programmed therein corresponding to one or more routines, an example of which is described with respect to FIG. 2.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 130.

As elaborated above, high pressure EGR system 83 may selectively introduce exhaust gases (e.g., external EGR) into the intake manifold 44 of cylinder 130. Introducing external EGR, such as the external EGR provided by high pressure EGR system 83, may adjust the combustion qualities of one or more combustion events in cylinder 130. For example, increasing an amount of external EGR may dilute an air-fuel mixture in the cylinder, which may reduce a peak in-cylinder temperature. As another example, introducing external EGR may increase an efficiency of an engine system, relative to engine systems not including external EGR. However, external EGR systems may experience a delay after a request for external EGR in the cylinder. Further, adjusting a composition of external EGR may impact other aspects of engine performance, such as cylinder AFR and emissions.

The inventors herein have advantageously recognized that EGR can be provided via an active pre-chamber incorporated in each cylinder, such as pre-chamber 138 of FIG. 1. For example, an air-fuel mixture may be combusted in the pre-chamber after intake valve closing, and exhaust gases from this pre-chamber combustion event may flow into the cylinder prior to combustion, thereby providing pre-chamber EGR. Providing pre-chamber EGR may change combustion qualities of the cylinder, such as a burn rate, ignitibility, air charge amount, and dilution of the air-fuel mixture, for example. As an example, pre-chamber EGR may include non-reactive combustion exhaust, unburnt oxygen ($O_2$), hydrogen gas ($H_2$), and unburnt hydrocarbons (e.g., unburnt fuel).

Providing pre-chamber EGR may provide several performance increases over external EGR provided by an external EGR system, such as high pressure EGR system 83 of FIG. 1. As an example, an amount and composition of pre-chamber EGR provided may be adjusted each combustion cycle, reducing a delay after a request for EGR. For example, in order to increase an amount of $H_2$ and an amount of unburnt fuel in the pre-chamber EGR, the pre-chamber may be operated rich (e.g., with an AFR less than stoichiometry). As another example, to increase an air charge of the cylinder, the pre-chamber may be operated lean (e.g., with an AFR greater than stoichiometry) in order to increase an amount of $O_2$ in the pre-chamber EGR. Further still, the pre-chamber EGR may be adjusted differently for each cylinder in the engine. In some examples, pre-chamber EGR may be used in combination with external EGR (and/or internal EGR generated via variable cam timing adjustments) in order to achieve desired combustion qualities in each cylinder. As an example, pre-chamber EGR may be used to balance a distribution of external EGR across the cylinders of the engine, as some cylinders may receive a higher proportion of external EGR than other cylinders due to their relative proximity to an EGR inlet. Thus, different cylinders may be operated with different amount of pre-chamber EGR in order to provide substantially the same amount of total EGR to each cylinder, as determined via crankshaft acceleration balancing between cylinders, for example. As another example, when pre-chamber EGR is used in combination with external EGR, the pre-chamber EGR may be reduced without significant delay in response to a change in engine operating conditions, such as a change in engine load, enabling a total amount of EGR provided to be quickly reduced even though the external EGR may be reduced more slowly.

Further, in active pre-chamber ignition systems, such as the cylinder configuration shown in FIG. 1, pre-chamber gases may enter the corresponding cylinder prior to cylinder combustion, which may change the AFR in the cylinder. Pre-chamber gases may include air injected into the pre-chamber and residual gases (e.g., exhaust gases from a previous combustion) purged from the pre-chamber. For example, a fraction of air injected into the pre-chamber may flow into the corresponding cylinder before cylinder combustion. As another example, the pre-chamber residual gases may flow into the cylinder before cylinder combustion. As still another example, providing pre-chamber EGR, as elaborated above, introduces pre-chamber gases which may change the AFR in the cylinder. The addition of such pre-chamber gases to the cylinder may cause the cylinder to operate at a different AFR than the commanded AFR. For example, if pre-chamber air (e.g., air injected into the pre-chamber) enters the cylinder before cylinder combustion, the cylinder AFR may be leaner (e.g., have a higher ratio of air to fuel) than commanded. As another example, if fuel-rich residual gases are purged into the cylinder prior to cylinder combustion, the overall cylinder AFR may be richer (e.g., have a lower ratio of air to fuel) than commanded. Such AFR deviations (e.g., uncommanded lean operation and/or uncommanded rich operation) may increase vehicle emissions, for example. Methods for compensating for the addition of pre-chamber gases to the cylinder, including the addition of pre-chamber EGR, are desired in order to reduce fueling errors in the cylinder.

Figure 2:
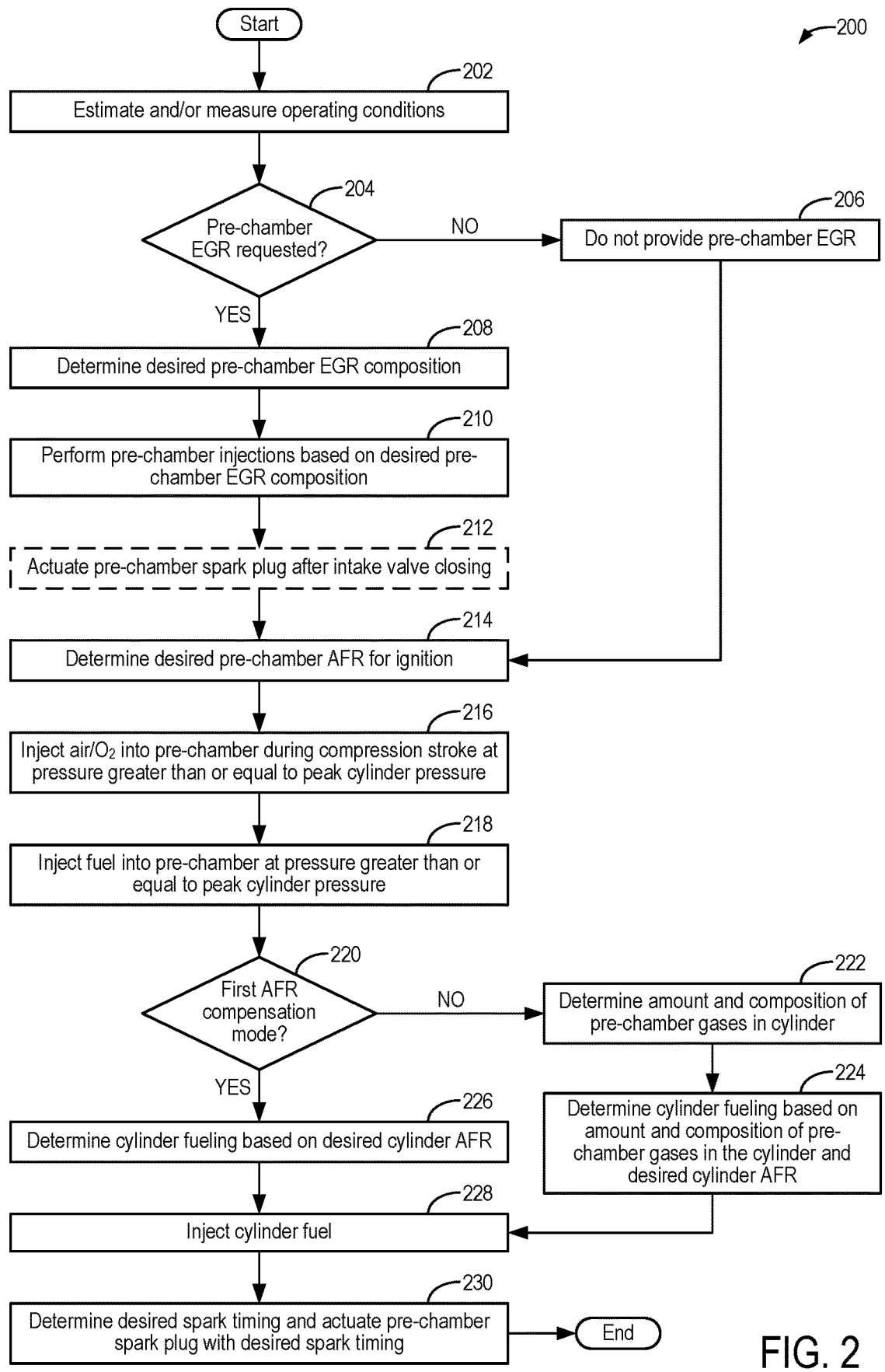
FIG. 2 shows an example method for operating a pre-chamber of a cylinder.

Therefore, FIG. 2 shows an example method for operating an engine having an active pre-chamber system, which may be used to produce on-demand EGR and/or to provide ignition, while maintaining a desired operating AFR in a cylinder. Method 200 will be described with respect to engine 10 and the cylinder configuration shown in FIG. 1, although method 200 may be applied in other systems that include a pre-chamber with a spark plug, a fuel injector, and an air/$O_2$ injector. Further, method 200 will be described for one pre-chamber and cylinder pair, although it may be understood that method 200 may be simultaneously and/or sequentially executed for every cylinder of the engine. For example, a composition of gases from the pre-chamber provided as EGR may vary from cylinder to cylinder and/or combustion cycle to combustion cycle. Instructions for carrying out method 200 and the rest of the methods included herein may be executed by a controller, such as controller 12 of FIG. 1, based on instructions stored on a memory of the controller and in conjunction with signals received from sensors of the engine system, such as the sensors described above with reference to FIG. 1. The controller may employ actuators of the engine system, including a pre-chamber fuel injector (e.g., pre-chamber fuel injector 96 of FIG. 1), a pre-chamber spark plug (e.g., pre-chamber spark plug 92 of FIG. 1), a pre-chamber air injector (e.g., pre-chamber air injector 94 shown in FIG. 1), and a cylinder fuel injector (e.g., cylinder fuel injector 66 of FIG. 1) to adjust engine operation according to the methods described below.

At 202, method 200 includes estimating and/or measuring operating conditions. The operating conditions may include, for example, vehicle speed, engine speed, engine load, an engine temperature, an exhaust gas AFR, an accelerator pedal position, a brake pedal position, an intake air flow, a position of a throttle (e.g., throttle position), and a position of an EGR valve (e.g., EGR valve 80 of FIG. 1). The operating conditions may be measured by one or more sensors communicatively coupled to the controller or may be inferred based on available data. For example, the accelerator pedal position may be measured by an accelerator pedal position sensor, such as accelerator pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque. As another example, the exhaust gas AFR may be determined based on an oxygen level detected by an exhaust gas oxygen sensor, such as exhaust gas sensor 128 of FIG. 1. Similarly, the throttle position may be measured using a throttle position sensor coupled to the throttle. Further, an amount or flow rate of external EGR provided may be determined based on the position of the EGR valve, at least in some examples. As yet another example, the intake air flow may be determined based on a measurement from a mass air flow (MAF) sensor, such as MAF sensor 123 shown in FIG. 1. As another example, the controller may use output from a throttle position (TP) sensor to determine a position of the throttle.

Estimating and/or measuring operating conditions further includes estimating cylinder pressure, which includes a peak cylinder pressure. For example, the controller may estimate and/or determine a characteristic relationship between a cylinder pressure and a piston position. Turning briefly to FIG. 6, an example plot 600 of a characteristic relationship between a pressure of a cylinder and a piston position of the cylinder during an intake stroke, a compression stroke, and a power stroke of the cylinder is shown. For plot 600, the vertical axis shows cylinder pressure. The horizontal axis shows piston position relative to top dead center (TDC) and bottom dead center (BDC) during the compression stroke and the power stroke of the cylinder.

Plot 600 includes a non-linear curve 602 that illustrates the relationship between the cylinder pressure and the piston position. A controller, such as controller 12 of FIG. 1, may estimate the cylinder pressure, including a peak cylinder pressure, based on the Ideal Gas Law, for example, which states a relationship between volume, pressure, and temperature for a closed container of a gas. Specifically, the Ideal Gas Law states that a pressure of the gas and a volume of the gas are inversely related. For example, when the piston position is at BDC, the cylinder volume is high, and so the cylinder pressure is low. As another example, as the piston position nears TDC (shown by a dashed line 616), the cylinder volume is low, and so the cylinder pressure is higher. The peak cylinder pressure (e.g., $P_p$) may be achieved when the cylinder volume is the lowest at TDC. As used herein, the peak cylinder pressure is defined as the maximum air pressure in the cylinder based on cylinder volume and is shown by a dashed line 604. Although the cylinder pressure may further increase during combustion, combustion pressures are not represented by curve 602. Further, the peak cylinder pressure may vary according to engine operating conditions. As an example, the peak cylinder pressure may be lower in low load operating conditions relative to the peak cylinder pressure in high load operating conditions. That is, when the engine is operating with a more open throttle, more air enters the engine, resulting in a higher peak cylinder pressure during the compression stroke before ignition and combustion.

Returning to FIG. 2, thus, based on the characteristic relationship between piston position and cylinder pressure, the controller may estimate the pressure in the cylinder throughout a combustion cycle. In particular, air charge (e.g., a mass of air in the cylinder inducted during an intake stroke), which may be determined based on intake manifold pressure (e.g., MAP), is used along with a volume of the cylinder to determine the cylinder pressure (e.g., via the Ideal Gas Law). For example, the volume of the cylinder throughout a combustion cycle may be estimated based on piston position, crank position, stroke, bore, and connecting rod length. As one example, the controller may input the current operating conditions, such as engine speed, engine temperature, and intake manifold pressure, into one or more look-up tables, functions, or maps, which may output the estimated cylinder pressure relative to piston position. Further, the controller may estimate the peak cylinder pressure by inputting the current engine operating conditions, such as engine speed, engine temperature, and intake manifold pressure, into one or more look-up tables, functions, or maps. In some examples, the controller may actively calculate the estimated cylinder pressure, including the peak cylinder pressure, in real-time or at pre-determined intervals, while in other examples, the controller may access pre-determined estimations stored in look-up tables and/or maps in controller memory according to the engine operating conditions.

At 204, method 200 includes determining whether pre-chamber EGR is requested. Because the composition of the pre-chamber EGR can be adjusted, as will be further elaborated below, the pre-chamber EGR may be requested over a wider range of operating conditions than external EGR in order to achieve a variety of combustion qualities or effects. Further, the pre-chamber EGR may be requested in addition to or as an alternative to external EGR. The pre-chamber EGR composition may be generally classified as inert, rich, or lean, and the different compositions may be requested during certain operating conditions to produce distinct effects on cylinder combustion.

As a first example, inert pre-chamber EGR may be requested to increase an engine dilution, thereby increasing a fuel efficiency and an emissions quality. In the first example, the inert pre-chamber EGR may be requested at low to medium engine loads, and the pre-chamber may be operated in a first EGR mode. For example, the inert pre-chamber EGR may include substantially inert (e.g., non-reactive) gases produced by stoichiometric combustion in the pre-chamber. Thus, in the first example, the inert pre-chamber EGR may be requested responsive to the engine load being within a threshold range defined by a first, lower threshold load and a second, higher threshold load. The first threshold load refers to a non-zero engine load below which dilution may decrease combustion stability, and the second threshold load refers to a different non-zero engine load above which dilution may decrease a power output of the engine. Additionally, the inert pre-chamber EGR may be desired after an exhaust catalyst (e.g., emission control device 178 of FIG. 1) has attained its light-off temperature, as the inert pre-chamber EGR may decrease combustion temperatures. Therefore, in some examples, the inert pre-chamber EGR may be requested responsive to the engine load being within the threshold range while the engine is warm (e.g., the catalyst is above its light-off temperature).

As a second example, rich pre-chamber EGR may be requested to aid in combustion. In the second example, the rich pre-chamber EGR may be produced by rich combustion in the pre-chamber and may include a relatively large concentration of hydrogen gas (e.g., $H_2$), which burns well in the presence of oxygen. Therefore, in the second example, the rich pre-chamber EGR may be requested responsive to conditions of decreased combustion stability in the cylinder, and the pre-chamber may be operated in a second EGR mode. The conditions of decreased combustion stability may include operating the engine with relatively high dilutions, such as when relatively high amounts of external EGR are provided. For example, rich pre-chamber EGR with a relatively large concentration of $H_2$ may be requested when an amount of external EGR exceeds a threshold amount of external EGR. The threshold amount of external EGR may be a non-zero, pre-determined amount of external EGR above which an occurrence of misfire may be increased. Additionally or alternatively, the conditions of decreased combustion stability may include the engine temperature being less than a threshold engine temperature. The threshold engine temperature may be a non-zero, positive temperature value that differentiates engine cold starts from engine hot starts, for example.

As a third example, lean pre-chamber EGR may be requested to increase an air charge of the cylinder beyond what is inducted via an intake valve. In the third example, the additional air charge provided by the lean pre-chamber EGR may increase a power output of the cylinder by enabling a corresponding increase in fueling. Thus, in the third example, the lean pre-chamber EGR may be requested responsive to the demanded amount of engine torque (or engine power) exceeding a threshold torque (or threshold power), and the pre-chamber may be operated in a third EGR mode. The threshold torque (or threshold power) refers to a non-zero, positive torque (or power) value above which intake stroke induction alone is unable to provide a large enough air charge to meet the demand.

Any or all of the above conditions from any of the first through third examples may be present for the pre-chamber EGR to be requested. Thus, requesting the pre-chamber EGR includes requesting any of the inert pre-chamber EGR (e.g., requesting to operate the pre-chamber in the first EGR mode), the rich pre-chamber EGR (e.g., requesting to operate the pre-chamber in the second EGR mode), or the lean pre-chamber EGR (e.g., requesting to operate the pre-chamber in the third EGR mode). Thus, the pre-chamber may be operated in three different EGR modes based on the type of EGR requested, as will be elaborated below.

If pre-chamber EGR is not requested, method 200 proceeds to 206 and includes not providing pre-chamber EGR. That is, the pre-chamber will not be operated to provide EGR to the cylinder, although it may be understood that pre-chamber gases may still passively flow and/or may be actively purged to the cylinder. For example, the pre-chamber may be operated to provide ignition to the cylinder, which may result in pre-chamber combustion gases exhausting to the cylinder even when the pre-chamber is not specifically operated to provide pre-chamber EGR. Operating the pre-chamber to provide ignition to the cylinder will be elaborated below beginning at 214.

If instead pre-chamber EGR is requested at 204, method 200 proceeds to 208 and includes determining a desired composition of the pre-chamber EGR. The composition of the pre-chamber EGR may include varying proportions of burnt exhaust gas (which may include a mixture of carbon monoxide, water vapor, nitrogen oxides, and hydrogen gas), unburnt air, and/or unburnt fuel. As one example, when the pre-chamber EGR is requested for increasing the dilution (e.g., by operating the pre-chamber in the first EGR mode described with respect to 204), the desired composition of the pre-chamber EGR may include substantially no unburnt air and unburnt fuel. As another example, when the pre-chamber EGR is requested to aid in combustion (e.g., by operating the pre-chamber in the second EGR mode described with respect to 204), the desired composition of the pre-chamber EGR may include a relatively high proportion of hydrogen gas. As a further example, when the pre-chamber EGR is requested to increase the air charge of the cylinder (e.g., by operating the pre-chamber in the third EGR mode described with respect to 204), the desired composition of the pre-chamber EGR may include a relatively high proportion of unburnt air, such as substantially all unburnt air.

As an example, the controller may input one or more operating conditions, such as the engine speed, the engine load, the demanded amount of torque, the engine temperature, and the amount of external EGR being provided into one or more look-up tables or maps, which may output the desired composition of the pre-chamber EGR for the input conditions. As another example, the controller may determine the desired composition of the pre-chamber EGR using logic rules that are a function of the engine speed, the engine load, the demanded amount of torque, the engine temperature, and the amount of external EGR being provided. For example, in order to achieve a desired amount of dilution in the cylinder, the controller may command both external EGR and pre-chamber EGR. This may enable rapid changes in dilution, as pre-chamber EGR may be reduced (e.g., stopped) or increased without a delay across combustion cycles. Therefore, the external EGR may comprise a first proportion (e.g., first percentage) of the desired amount of dilution, and the pre-chamber EGR may comprise a second proportion (e.g., second percentage) of the desired amount of dilution. In some examples, the first proportion is larger than the second proportion, while in other examples, the second proportion is larger than or equal to the first proportion. Further, in some examples, the controller may determine the first proportion and the second proportion as a function of the engine operating conditions, such as the engine load and the engine temperature, while in other examples, the first proportion and the second proportion are fixed values that are applied across all operating conditions where external EGR is requested. Whether variable or fixed, the second proportion may be calibrated to reduce an occurrence of misfire during rapid load decreases (e.g., tip-out events). For example, responsive to the tip-out event, the pre-chamber EGR (e.g., the second proportion of a total amount of EGR provided) may be immediately shut off, while the reduction of the external EGR (e.g., the first proportion of the total amount of EGR provided) may occur with some delay due to an intake manifold volume.

In some examples, the controller may further take into account a desired cylinder AFR. As will be elaborated below at 220, in order to operate the cylinder at the desired cylinder AFR, either the desired composition of the pre-chamber EGR is proactively adjusted to produce the desired cylinder AFR without additional cylinder fueling adjustments, or the cylinder fueling is adjusted to produce the desired cylinder AFR by taking into account the composition of the pre-chamber gases. For example, while operating in a first AFR compensation mode, the pre-chamber EGR is proactively adjusted so that cylinder AFR and fueling disturbances are not produced. In contrast, while operating in a second AFR compensation mode, the cylinder fueling may be adjusted based on the amount and composition of the pre-chamber gases in the cylinder. The first AFR compensation mode may be selected while operating in the first pre-chamber EGR mode, and the second AFR compensation mode may be selected while operating in the second or third pre-chamber EGR mode, at least in some examples.

In some examples, the controller may associate the desired composition of the pre-chamber EGR with a pre-chamber AFR for producing pre-chamber EGR having the desired composition (e.g., a pre-chamber AFR for producing EGR). For example, the controller may store a look-up table or map that relates the composition of the pre-chamber EGR to the pre-chamber AFR, such as shown in FIG. 3. Turning briefly to FIG. 3, a chart 300 shows an example relationship between a pre-chamber AFR and a composition of pre-chamber EGR. A relative amount of $H_2$ is shown in plot 302, a relative amount of unburnt hydrocarbons is shown in plot 304, and a relative amount of $O_2$ is shown in plot 306. Further, stoichiometry is shown by dashed line 308. For all of the above, the vertical axis shows a relative gas amount in the pre-chamber EGR, with the amount increasing up the vertical axis from bottom to top. The horizontal axis shows the pre-chamber AFR, with the pre-chamber AFR value increasing along the horizontal axis from left to right. The pre-chamber AFR is also shown relative to stoichiometry (dashed line 308). Lean pre-chamber AFRs are to the right of stoichiometry (dashed line 308), while rich pre-chamber AFRs are to the left of stoichiometry (dashed line 308).

As shown in chart 300, a relative amount of $H_2$ is high (plot 302) at extremely rich pre-chamber AFRs (e.g., significantly less than stoichiometry). Further, the relative amount of $H_2$ decreases as the relative pre-chamber AFR increases to stoichiometry, and almost no $H_2$ is present in the stoichiometric exhaust gas mixture (plot 302). As shown in plot 302, the relative amount of $H_2$ remains close to zero at all pre-chamber AFRs greater than stoichiometry (e.g., lean relative to stoichiometry).

Similar to the relative amount of $H_2$ shown in plot 302, the relative amount of unburnt hydrocarbons is high (plot 304) at extremely rich pre-chamber AFRs (e.g., significantly less than stoichiometry). The relative amount of unburnt hydrocarbons decreases as the relative pre-chamber AFR increases toward stoichiometry and is equal to approximately zero at stoichiometry (plot 304). For example, by definition, substantially all of the fuel is consumed when the pre-chamber operates at stoichiometry, resulting in substantially no unburnt hydrocarbons. The relative amount of unburnt hydrocarbons remains close to zero as the relative pre-chamber AFR increases above stoichiometry. However, at extremely lean AFRs, the relative amount of unburnt hydrocarbons increases rapidly due to incomplete combustion (plot 304). Further, at extremely lean AFRs, a probability of cylinder misfire increases.

In contrast to the relative amount of $H_2$ (plot 302) and the relative amount of hydrocarbons (plot 304), the relative amount of $O_2$ may be approximately zero for all pre-chamber AFRs rich relative to stoichiometry, as shown in plot 306. However, at pre-chamber AFRs lean relative to stoichiometry, the relative amount of $O_2$ may increase linearly with respect to the relative pre-chamber AFR (plot 306).

Returning to FIG. 2, in some examples, the controller may determine the pre-chamber AFR for producing EGR (e.g., the pre-chamber AFR for producing pre-chamber EGR having the desired composition) using the look-up table or map relating the pre-chamber AFR to the pre-chamber EGR composition, such as the example relationship shown in FIG. 3. For example, the controller may input the desired composition of the pre-chamber EGR into one or more look-up tables, graphs, or functions, which may output the pre-chamber AFR for producing EGR with the desired composition. The pre-chamber AFR for producing EGR is the AFR for a pre-chamber combustion event used specifically to produce the pre-chamber EGR (versus a pre-chamber AFR for providing ignition, as will be elaborated below at 218).

In some examples, the controller may actively calculate the pre-chamber AFR for producing EGR based on the desired composition of the pre-chamber EGR, while in other examples, the controller may access pre-determined estimations stored in look-up tables and/or maps in controller memory according to the engine operating conditions. As one example, when the desired composition of the pre-chamber EGR includes substantially no unburnt air and unburnt fuel, the pre-chamber AFR for producing EGR may be stoichiometry. As another example, when the desired composition of the pre-chamber EGR includes a relatively high proportion of hydrogen gas, the pre-chamber AFR for producing EGR may be rich relative to stoichiometry. As a further example, when the desired composition of the pre-chamber EGR includes a relatively high proportion of unburnt air, the pre-chamber AFR for producing EGR may be lean relative to stoichiometry. However, in still other examples, the desired pre-chamber EGR composition may not include combustion products (e.g., it may include only air or only unburnt fuel), and thus, the controller may not determine the pre-chamber AFR for producing EGR.

At 210, method 200 includes performing pre-chamber injections based on the desired pre-chamber EGR composition. In some examples, both fuel and air may be injected into the pre-chamber based on the desired composition of the pre-chamber EGR. For example, air and fuel may be injected based on the pre-chamber AFR for producing EGR, as determined at 208. In some examples, the air injected may be ambient air from an intake manifold of the engine, while in other examples, the pre-chamber air injector may provide onboard-generated $O_2$ or another combustible gas such as $H_2$. For example, the controller may determine an air amount and a fuel amount by inputting the engine operating conditions, including the piston position and the pre-chamber AFR for producing EGR, into one or more look-up tables, algorithms, or maps, which may output the desired air amount and the desired fuel amount. After determining the air amount, the controller may inject the air amount by adjusting the pulse-width of an actuation signal sent to the pre-chamber air injector. Further, the controller may inject the fuel amount by adjusting the pulse-width of an actuation signal sent to the pre-chamber fuel injector, such as FPW2 shown in FIG. 1. The injected fuel may mix with the injected air to form an air-fuel mixture having the pre-chamber AFR for producing EGR. In this way, the controller may perform pre-chamber injections based on the desired pre-chamber EGR composition.

In other examples, only air may be injected into the pre-chamber based on the desired composition of the pre-chamber EGR. For example, when the desired composition of the pre-chamber EGR is substantially all unburnt air, the desired fuel amount is zero, and the controller may inject the desired amount of air into the pre-chamber without injecting fuel into the pre-chamber.

At 212, method 200 optionally includes actuating the pre-chamber spark plug after intake valve closing, producing the EGR pre-chamber combustion event. The spark plug may be actuated after intake valve closing when both air and fuel are injected into the pre-chamber at 210, for example, in order to combust the air-fuel mixture in the pre-chamber. For example, the controller may generate a control signal (e.g., signal SA) that is sent an ignition system (e.g., ignition system 88 of FIG. 1) to actuate the pre-chamber spark plug responsive to intake valve closing. Generating the spark in the pre-chamber may cause the air-fuel mixture in the pre-chamber to combust. In some examples, such as when only air is injected into the pre-chamber at 210, the spark plug may not be actuated at 212, and the EGR pre-chamber combustion event may not occur.

At 214, method 200 includes determining a desired pre-chamber AFR for ignition. The desired pre-chamber AFR for ignition may be determined by the controller based on the AFR of the cylinder, such that combustion of an air-fuel mixture in the pre-chamber ignites an air-fuel mixture in the cylinder while minimizing emissions, as an example. For example, the controller may input the AFR of the cylinder and the current engine operating conditions, such as engine temperature and fuel composition, into one or more look-up tables, function, and maps, which may output the desired pre-chamber AFR to achieve combustion. As an example, the desired pre-chamber AFR for ignition may be stoichiometry. As another example, the desired pre-chamber AFR for ignition may be rich relative to stoichiometry during an engine cold start condition, which may increase combustion stability in the cold start condition, for example. As still another example, the desired pre-chamber AFR for ignition may be richer than stoichiometry when fuels with higher evaporation temperatures, such as E85, are used in order to account for evaporated fuel that participates in the combustion and non-evaporated fuel that does not participate in combustion to achieve a substantially stoichiometric combustion with the evaporated fuel. As yet another example, the desired pre-chamber AFR for ignition may be adjusted from stoichiometry when an operating AFR of the cylinder is adjusted from stoichiometry such that when the combustion gases from the cylinder and the pre-chamber are combined, the combined gases have an AFR approximately equal to stoichiometry. The desired pre-chamber AFR for ignition may be different than the pre-chamber AFR for producing EGR (when applicable) in order to provide desired ignition properties.

At 216, method 200 includes injecting air and/or $O_2$ into the pre-chamber at a pressure greater than or equal to peak cylinder pressure during the compression stroke. Further, the air may be injected one or more times at the pressure higher than peak cylinder pressure for each injection event. For example, a first air injection may be a purge injection that pushes out pre-chamber exhaust gases, which may remain in the pre-chamber from a previous combustion event, and a second air injection may be provided for a current combustion event. The previous combustion event may be from a previous combustion cycle (such as when the previous combustion event is for ignition) or from a same combustion cycle (such as when the previous combustion event is for producing pre-chamber EGR). Returning to FIG. 6, the controller may perform said air injections during the intake stroke and/or the compression stroke, based on cylinder pressure. For example, the controller may perform the first air injection during the intake stroke of the cylinder and the second air injection during the compression stroke of the cylinder. As another example, the controller may perform both of the first air injection and the second air injection during the compression stroke of the cylinder. As a non-limiting example, plot 600 includes a first purging region 606 between a piston position 610 and a piston position 612, and a second purging region 607 between a piston position 618 and a piston position 620. For example, the controller may perform the purge injection during at least one of the first purging region 607, which occurs during the intake stroke, and the second purging region 606, which occurs during the compression stroke. In some examples, the controller may divide the first injection (e.g., the purge injection) between the first purging region 607 and the second purging region 606. In second purging region 606, the controller may command air injection in the pre-chamber while pressure in the cylinder is low at piston position 610, which may encourage purging pre-chamber gases from a previous combustion cycle and/or a pre-chamber EGR combustion into the cylinder. As another non-limiting example, the controller may command air injection in the pre-chamber after exhaust valve closing at piston position 618 during the first purging region 607, which may purge pre-chamber gases from a previous combustion cycle into the cylinder. As another non-limiting example, plot 600 includes an injection region 608 between piston position 612 and a piston position 614. In injection region 608, air may be injected into the pre-chamber to introduce air into the pre-chamber before pre-chamber combustion.

Returning to 216 of FIG. 2, the pressure of air injected into the pre-chamber during each of the first air injection and the second air injection may be determined by inputting engine operating conditions (e.g., engine load and engine temperature) and the peak cylinder pressure into one or more look-up tables, maps, or functions, which may output an air pressure that is greater than or equal to the peak cylinder pressure for the input conditions. Further, the air is injected into the pre-chamber by actuating the air injector during the compression stroke, for example. For example, for each of the first air injection and the second air injection, the controller may adjust a pulse width of an actuation signal sent to the air injector in order to inject a determined amount of air (e.g., ambient air, $O_2$, or the like) into the pre-chamber at the determined air pressure. Injecting the first air injection at the pressure at or above peak cylinder pressure may promote purging of pre-chamber gases (e.g., the pre-chamber EGR or exhaust gases from a previous ignition event) into the cylinder, for example. As another example, injecting the second air injection at or above peak cylinder pressure may increase mixing of air and fuel in the pre-chamber, which may increase ignitibility of an air-fuel mixture (e.g., the air-fuel mixture in the pre-chamber for ignition). However, in some operating conditions, such as a fuel cut condition, a single air injection may be performed in order to decrease an amount of oxygen escaping the pre-chamber.

At 218, method 200 includes injecting fuel into the pre-chamber at a pressure greater than or equal to the peak cylinder pressure during the compression stroke. Further, the pre-chamber fuel injection may be performed during the injection region 608 of FIG. 6 introduced above. Pre-chamber fuel injected at 218 may mix with pre-chamber air injected at 216, during the second air injection, for example, and may create the pre-chamber air-fuel mixture for ignition. For example, a desired amount of fuel is injected into the pre-chamber by actuating the fuel injector during the compression stroke. The desired amount of fuel may be determined according to the desired pre-chamber AFR for ignition. The pressure of fuel injected into the pre-chamber may be determined based on engine operating conditions by referring to one or more look-up tables, maps, or functions, and further may be calibrated to promote combustion stability. For example, the controller may adjust a pulse width of an actuation signal sent to the fuel injector to inject the desired amount of fuel into the pre-chamber at the determined fuel pressure. Injecting the fuel above the peak cylinder pressure may promote flow into the pre-chamber, for example. As another example, injecting the fuel above the peak cylinder pressure may increase mixing of air and fuel in the pre-chamber, which may increase ignitibility of the air-fuel mixture in the pre-chamber. By injecting air into the pre-chamber at 216 and injecting fuel into the pre-chamber at 216, the pre-chamber may be filled with an air-fuel mixture for ignition.

At 220, method 200 includes determining whether the first AFR compensation mode is selected. As mentioned above, the first AFR compensation mode includes proactively adjusting pre-chamber gases, including pre-chamber EGR and/or exhaust gases from pre-chamber ignition, in order to produce a desired AFR in the cylinder. In contrast, in the second AFR compensation mode, the cylinder fueling is adjusted to compensate for the amount and composition of the pre-chamber gases in the cylinder. The first AFR compensation mode may be selected while operating in the first pre-chamber EGR mode and/or while stoichiometric gases are purged from the pre-chamber to the cylinder. The second AFR compensation mode may be selected while operating in the second or third pre-chamber EGR mode and/or while non-stoichiometric (e.g., rich or lean) gases are purged from the pre-chamber to the cylinder.

As an example, the controller may determine whether or not the first AFR compensation mode is selected based on the desired composition of the pre-chamber EGR and/or the desired pre-chamber AFR for ignition. For example, the controller may determine that the first AFR compensation mode is selected responsive to the desired composition of the pre-chamber EGR (when included) and the desired pre-chamber AFR for ignition together producing stoichiometric pre-chamber gas in the cylinder. As another example, the controller may determine that the first AFR compensation mode is not selected (e.g., the second AFR compensation mode is selected) responsive to the desired composition of the pre-chamber (when included) and the desired pre-chamber AFR for ignition together producing non-stoichiometric pre-chamber gas in the cylinder.

If the controller determines that the first AFR compensation mode is not selected at 220, method 200 continues to 222 and includes determining an amount and composition of pre-chamber gases in the cylinder. The pre-chamber gases in the cylinder may include a mixture of both pre-chamber EGR and purged pre-chamber gases from the previous combustion cycle, and the composition may include a mixture of inert exhaust gas, unburnt fuel, and unburnt air. As such, determining the amounts of the pre-chamber gases in the cylinder may include determining an amount and a composition of (inert) exhaust gas purged from the pre-chamber (or a proportion of the exhaust gas in a total amount of pre-chamber gases), an amount of unburnt fuel purged from the pre-chamber (or a proportion of the unburnt fuel in the total amount of pre-chamber gases), and an amount of air purged from the pre-chamber (or a proportion of air in the total amount of pre-chamber gases). As an example, the amount of exhaust gases purged from the pre-chamber may be determined based on the pre-chamber AFR for producing EGR and a volume of exhaust gases purged from the pre-chamber, which may be equal to a volume of the pre-chamber. Thus, in some examples, the amount of exhaust gases purged from the pre-chamber may be determined based on a known relationship between cylinder pressure, a geometry of the pre-chamber, and a geometry of the pre-chamber openings by referring to one or more look-up tables, maps, or functions. For example, the controller may estimate cylinder pressure based on piston position during pre-chamber purging (e.g., at 216), and may determine the amount of exhaust gas by inputting the estimated cylinder pressure into one or more look-up tables, maps, or functions. As another example, the composition of the pre-chamber gases in the cylinder may be determined based on the known relationship between pre-chamber AFR and composition of the pre-chamber EGR, as elaborated above in FIG. 3. For example, the controller may input the pre-chamber AFR for EGR into one or more look-up tables, maps, or functions, which may output the composition of the pre-chamber gases in the cylinder.

At 224, method 200 includes determining cylinder fueling based on the amount and composition of pre-chamber gases in the cylinder and a desired cylinder AFR. Specifically, determining cylinder fueling may include determining an amount of fuel for injection in the cylinder in order to operate the cylinder the desired AFR. The desired AFR for the cylinder may be stoichiometry, for example. In other examples, the desired AFR for the cylinder may be lower (e.g., richer) or higher (e.g., leaner) than stoichiometry. The controller may determine the amount of fuel for injection in the cylinder based on the desired AFR, the amounts of pre-chamber gases in the cylinder, and an amount of air inducted into the cylinder during the intake stroke. For example, the amount of fuel for injection in the cylinder may be equal to the air mass inducted into the cylinder, added to the amount of air purged from the pre-chamber, less the amount of exhaust gas purged from the pre-chamber, less the amount of unburnt fuel purged from the pre-chamber. In one example, when the controller determines that additional unburnt air is in the cylinder (e.g., as purged from the pre-chamber), it may increase the cylinder fueling amount in order to maintain stoichiometry in the cylinder. In another example, when the controller determines that fuel-rich pre-chamber gases are in the cylinder, it may decrease the cylinder fueling amount in order to maintain stoichiometry in the cylinder. Although air and fuel from may escape into the pre-chamber during the injection region 608 of FIG. 6, such leakage may be considered stoichiometric, for example, and may not be compensated for in the cylinder fuel adjustment. The controller may determine the amount of air inducted during the intake stroke based on output from one or more of the MAP sensor, the throttle position sensor, and the MAF sensor, combined with an intake valve opening time, by referring to one or more look-up tables, maps, or functions. Further, in cylinder configurations with external EGR, such as the cylinder configuration of FIG. 1, the controller may adjust the determined cylinder fueling based on an amount of EGR flowing into the cylinder and an AFR of the EGR by referring to one or more look-up tables, graphs, or functions.

Returning to 220, if the controller determines that the first AFR compensation mode is selected, method 200 proceeds to 226 and includes determining cylinder fueling based on the desired cylinder AFR. For example, the controller may input the desired cylinder AFR, the amount of air inducted into the cylinder, and other engine operating conditions into one or more look-up tables, maps, or functions, which may output the amount of fuel to inject in the cylinder. The desired cylinder AFR may be determined based on engine operating conditions including engine load, engine temperature, and exhaust gas temperature. For example, the desired cylinder AFR may be approximately stoichiometry. As another example, the desired cylinder AFR may be lean relative to stoichiometry in order to increase a temperature of the exhaust gas, for example. At 228, method 200 includes injecting cylinder fuel into the cylinder. The controller may inject cylinder fuel based on the cylinder fuel amount determined at 224 or 226. For example, the controller may inject the cylinder fuel amount by adjusting the pulse-width of an actuation signal sent to the cylinder fuel injector, such as FPW1 shown in FIG. 1. The injected fuel may mix with gases present in the cylinder, including pre-chamber gases and air inducted during the intake stroke, to form an air-fuel mixture. Thus, prior to combustion in the cylinder, the cylinder may include a mixture of inducted air, injected fuel, and pre-chamber gases (e.g., the pre-chamber EGR and/or purged gases from a previous combustion cycle). In some examples, the cylinder may further include external EGR provided by an external EGR system.

At 230, method 200 includes determining a desired spark timing for providing ignition and actuating the pre-chamber spark plug with the desired spark timing to ignite cylinder fuel. Determining the pre-chamber spark timing may include determining when to ignite the air-fuel mixture in the pre-chamber relative to a position of a piston of the cylinder. Although a cylinder spark plug firing induces combustion in a cylinder of a traditional spark-ignition engine, in an engine with pre-chamber ignition, combustion of an air-fuel mixture in the pre-chamber induces combustion in the cylinder. Thus, just as cylinder spark timing in the traditional spark-ignition engine may be adjusted relative to the spark timing for maximum brake torque (MBT) based on engine operating conditions, the timing of the pre-chamber firing event may be shifted relative to MBT based on engine operating conditions in order to achieve a desired cylinder ignition timing. For example, the pre-chamber spark timing may be retarded relative to MBT timing to increase an exhaust gas temperature, while the pre-chamber spark timing may be advanced closer to MBT timing to increase a torque output of the cylinder. As another example, if the engine is borderline limited and is unable to operate at MBT timing, engine knock control may advance or retard the pre-chamber spark timing to operate the engine at the borderline limit. In one example, the controller may input one or more engine operating conditions (e.g., engine speed, engine load, the exhaust gas temperature, a borderline knock limit, and cylinder AFR) into one or more look-up tables, functions, or maps to determine the pre-chamber spark timing. In another example, the controller may make a logical determination (e.g., regarding the pre-chamber spark timing) based on logic rules that are a function of the one or more engine operating conditions. Further, the controller may generate a control signal that is sent the ignition system to actuate the pre-chamber spark plug at the desired spark timing. Generating the spark in the pre-chamber may cause the air-fuel mixture in the pre-chamber to combust, sending jets of hot gas and flame into the cylinder via a plurality of holes in the pre-chamber walls. When the cylinder also includes a combustible air-fuel mixture, the jets of hot gas and flame ignite the air-fuel mixture in the cylinder. After 224, method 200 may end. For example, method 200 may be repeated during each combustion cycle to actively manage cylinder combustion via pre-chamber EGR.

In this way, combustion qualities of a cylinder may be adjusted by advantageously utilizing an active pre-chamber to provide pre-chamber EGR, thereby adjusting combustion qualities of the cylinder. Further, in some examples, cylinder fueling may be compensated based on the composition of pre-chamber gases in the cylinder, whereas in other examples, the composition of the pre-chamber gases may be proactively adjusted instead of adjusting the cylinder fueling. In some examples, method 200 may run continuously during nominal engine operation in order to continuously provide a cylinder ignition source when indicated. Method 200 provides the benefits of active pre-chamber ignition and leverages the active pre-chamber to provide a responsive and adjustable internal EGR system. Providing the pre-chamber EGR may allow control over cylinder combustion qualities, such as ignitibility, burn rate, and efficiency, for example. For example, providing pre-chamber EGR to the cylinder prior to cylinder combustion may include providing additional $H_2$, which may increase an ignitibility of the air-fuel mixture in the cylinder. Thus, by providing the pre-chamber EGR via a dedicated pre-chamber combustion event, a performance and efficiency of the cylinder may be increased across a range of operating conditions in addition to the performance benefits offered by pre-chamber ignition.

Turning now to FIG. 4, an exemplary timing chart 400 of operating a cylinder with pre-chamber ignition, including pre-chamber EGR, is shown. The cylinder may be cylinder 130 of engine 10 in FIG. 1, for example, and may include a pre-chamber ignition system (e.g., pre-chamber 138 of FIG. 1). Timing chart 400 shows an intake stroke and a compression stroke of one combustion cycle, wherein the combustion cycle (e.g., a cylinder cycle) refers to four strokes (intake, compression, power, and exhaust) of an engine cycle within a cylinder. A piston position relative to top dead center (TDC), bottom dead center (BDC), and the two strokes of the combustion cycle (intake and compression) is shown in plot 402. Further, a pre-chamber fuel injection signal is shown in plot 404, a pre-chamber air injection signal is shown in plot 406, an intake valve lift is shown in dashed plot 408, an exhaust valve lift is shown in plot 410, a cylinder fuel injection signal is shown in plot 412, and a spark plug actuation signal is shown by plot 414. For all of the above, the horizontal axis represents engine position (e.g., in crank angle degrees), with the crank angle degrees (CAD) increasing from left to right. The vertical axis represents each labeled parameter. For plot 402, the vertical axis shows piston position relative to TDC. For each of the plots 404, 406, 412, and 414, an increase in magnitude of the parameter above zero indicates actuation of the corresponding injector or spark plug. For plots 408 and 410, the lift of the corresponding valve increases up the vertical axis from zero. Further, the stroke of the combustion cycle is indicated at the top of timing chart 400. The intake stroke corresponds to an interval from 0 CAD to 180 CAD, and the compression stroke corresponds to an interval from 180 CAD to 360 CAD.

At the start of the intake stroke (e.g., at 0 CAD), the intake valve opens (dashed plot 408), introducing air into the cylinder via an intake manifold and one or more intake ports. Further, an exhaust valve open duration may overlap with an intake valve open duration, such that the exhaust valve is open at 0 CAD (plot 410). Just after the start of the intake stroke at CAD1, the exhaust valve closes (plot 410), resulting in positive valve overlap between the intake valve and the exhaust valve. Just after the exhaust valve closes at CAD1, purge air is injected into the pre-chamber in order to purge combustion gases from the previous combustion cycle. Between 0 CAD and 180 CAD, the piston position moves to the bottom of the cylinder (plot 402) so as to increase the volume within the cylinder. Just before the end of the intake stroke at CAD2, fuel is introduced into the pre-chamber (plot 404) via a pre-chamber fuel injector (e.g., pre-chamber fuel injector 96 of FIG. 1) and air is introduced into the pre-chamber (plot 406) via a pre-chamber air injector (e.g., pre-chamber air injector 94 of FIG. 1), forming a first air-fuel mixture in the pre-chamber.

Next, just after the beginning of the compression stroke at CAD3, the intake valve closes (plot 410), sealing the combustion chamber from the intake manifold. In a process herein referred to as ignition, the first air-fuel mixture in the pre-chamber is ignited via actuating a spark plug (e.g., spark plug 92 of FIG. 1) at CAD3 (plot 414), combusting the first air-fuel mixture in the pre-chamber. As a result, flame and hot gas jet into the cylinder, while a portion of exhaust gas from the combustion remains in the pre-chamber. However, because the cylinder is not fueled, the jets of flame and hot gas from the pre-chamber combustion event to not provide ignition to the cylinder, and do not produce a cylinder combustion event. Further, after combusting the air-fuel mixture in the pre-chamber, an air injection event introduces additional purge air into the pre-chamber at CAD4 (plot 406). Introducing additional purge air into the pre-chamber forces pre-chamber exhaust into the cylinder as pre-chamber EGR. For example, a mixture of non-reactive combustion exhaust, hydrogen-rich exhaust, unburnt fuel, unburnt air, and purge air may flow into the cylinder and may affect combustion qualities in the cylinder.

During the compression stroke, the piston moves toward the cylinder head so as to compress the air within the cylinder (plot 402). At CAD5, fuel is introduced into the pre-chamber via the pre-chamber fuel injector (plot 404) and air is introduced into the pre-chamber via the pre-chamber air injector (plot 406), forming a second air-fuel mixture in the pre-chamber. Further, a cylinder fuel injection event introduces an amount of cylinder fuel into the cylinder at CAD6 (plot 412), such that the injected fuel forms a third air-fuel mixture with air inducted into the cylinder via the one or more intake ports and the pre-chamber EGR.

Just before TDC of the compression stroke at CAD7, the spark plug actuates (plot 414), igniting the second air-fuel mixture in the pre-chamber. During pre-chamber combustion, jets of flame and hot gas ignite the third air-fuel mixture in the cylinder, thus providing an ignition source for cylinder combustion, which produces torque for the engine.

In this way, pre-chamber EGR may be provided by a first pre-chamber combustion event, in the pre-chamber, and the resulting exhaust gases may be purged from the pre-chamber into the cylinder via a purge air injection. As elaborated in the method of FIG. 2, the desired composition of pre-chamber EGR may be based on desired combustion qualities of the cylinder, and may be controlled via the pre-chamber AFR during the first combustion event (e.g., the first pre-chamber AFR). For example, the composition of the pre-chamber EGR may be adjusted by adjusting the signals shown in FIG. 4. For example, the pre-chamber AFR during the first combustion event may be controlled via adjusting the pre-chamber air injection signal (plot 406) and the pre-chamber fuel injection signal (plot 404). In a first example, pre-chamber EGR may be used to increase dilution in the cylinder by providing largely inert pre-chamber EGR, such as by commanding a stoichiometric first pre-chamber AFR during the first combustion event. For example, the amount of pre-chamber fuel (plot 404) and the amount of pre-chamber air (plot 406) injected at CAD2 may be adjusted for stoichiometry. In a second example, pre-chamber EGR may be used to increase ignitibility by increasing an amount of $H_2$ and unburnt hydrocarbons in the pre-chamber EGR, such as by commanding a rich first pre-chamber AFR during the first combustion event. For example, the amount of pre-chamber fuel (plot 404) and the amount of pre-chamber air (plot 406) injected at CAD2 may be adjusted for a rich AFR, such as by increasing the relative amount of fuel injected and/or by decreasing the relative amount of air injected. In a third example, pre-chamber EGR may be used to increase an air-charge of the cylinder by increasing the amount of oxygen in the pre-chamber EGR. In order to increase the amount of $O_2$ in the pre-chamber EGR, the controller may command a lean first pre-chamber AFR during the first combustion event. For example, the controller may increase the amount of pre-chamber air (plot 406) injected at CAD2. Additionally or alternatively, the controller may increase the amount of $O_2$ in the pre-chamber EGR by injecting $O_2$ while not injecting fuel and not actuating the spark plug to provide the first combustion event in each combustion cycle. For example, the controller may inject pre-chamber air (plot 406) at CAD2, but may not inject pre-chamber fuel (plot 404) at CAD2 and may not actuate the pre-chamber spark plug at CAD3. Further, the pre-chamber may be used to provide an ignition source to the cylinder, igniting an air-fuel mixture in the cylinder, generating torque. Turning now to FIG. 5, a prophetic example timeline 500 for operating a cylinder with a pre-chamber is shown. Responsive to engine operating conditions, the pre-chamber may provide pre-chamber EGR to adjust combustion qualities of the cylinder. The engine may be engine 10 of FIG. 1, for example, and may include a controller (e.g., controller 12). As shown in FIG. 1, each cylinder of the engine includes a cylinder fuel injector (e.g., cylinder fuel injector 66) and a pre-chamber (e.g., pre-chamber 138), including a pre-chamber spark plug (e.g., spark plug 92), a fuel injector (e.g., a pre-chamber fuel injector 96) and a pre-chamber air injector (e.g., pre-chamber air injector 94). A pre-chamber EGR mode is shown in plot 502, a pre-chamber AFR for providing EGR (e.g., a first pre-chamber AFR) is shown in plot 504, a cylinder fuel amount is shown in plot 506, an engine load is shown in plot 508, an engine temperature is shown in plot 510, an amount of external EGR is shown in plot 512, and a demanded amount of torque is shown in plot 514. Further, a cylinder fuel amount for cylinder operation without pre-chamber EGR is by a dashed line 516. Thus, the cylinder fuel amount shown in plot 506 is shown relative to the cylinder fuel amount without pre-chamber EGR (dashed line 516), although it should be understood that a value of the cylinder fuel amount without pre-chamber EGR may change based on operating conditions. Further still, a first, upper threshold engine load is shown by dashed line 518, a second, lower threshold engine load is shown by dashed line 520, a threshold engine temperature is shown by dashed line 522, a threshold position of the external EGR valve is shown by dashed line 524, and a threshold torque is shown by dashed line 526.

For all of the above, the horizontal axis represents time, with time increasing along the horizontal axis from left to right. The vertical axis represents each labeled parameter. For each of plots 506, 508, and 510, a magnitude of the parameter increases up the vertical axis. For plot 502, the vertical axis shows whether the engine is operating with no pre-chamber EGR ("0"), with a first pre-chamber EGR mode ("1"), with a second pre-chamber EGR mode ("2"), or with a third pre-chamber EGR mode ("3"). For example, operating in the first pre-chamber EGR mode includes providing stoichiometric pre-chamber EGR to the cylinder, such as in the first example described with respect to 204 of method 200. Operating in the second pre-chamber EGR mode includes providing rich pre-chamber EGR to the cylinder, such as in the second example described with respect to 204 of method 200. Operating in the third pre-chamber EGR mode includes providing lean pre-chamber EGR to the cylinder, such as in the third example described with respect to 204 of method 200, including providing substantially all unburnt air to the cylinder. Operating with no pre-chamber EGR includes not providing pre-chamber EGR to the cylinder. For plot 504, the first pre-chamber AFR increases relative to stoichiometry ("S") up the vertical axis towards a highly lean mixture ("L"), and decreases down the vertical axis towards a highly rich mixture ("R"). The highly lean mixture may be substantially all unburnt air, while the highly rich mixture may be substantially all unburnt fuel. For plot 512, the vertical axis shows a position of the external EGR valve from a fully open position ("Open") to a fully closed position ("Closed").

Between time t0 and time t1, the engine load (plot 508) is below the second, lower threshold engine load (dashed line 520). The second, lower threshold engine represents a load below which inert EGR (both pre-chamber and external EGR) is not provided for engine dilution, as misfire may occur. Further, the engine temperature (plot 510) is below the threshold engine temperature (dashed line 522), indicating a cold start condition. In order to increase combustion stability in the cylinder, the engine operates in the second pre-chamber EGR mode (plot 502), and thus operates with a rich pre-chamber AFR for producing EGR (plot 504). As a result, rich pre-chamber EGR including $H_2$ flows to the cylinder, increasing ignitibility of the air-fuel mixture in the cylinder. Further, because additional unburnt fuel is delivered to the cylinder via the rich pre-chamber EGR, the cylinder fuel amount is adjusted to a lower fuel amount (plot 506) relative to the cylinder fuel amount without pre-chamber EGR (dashed line 516).

At time t1, the engine load increases (plot 508) above the second, lower threshold engine load (dashed line 520) while remaining below the first, upper threshold engine load (dashed line 518). The first, upper threshold engine load corresponds to a load above which inert EGR (both pre-chamber and external EGR) is not provided, as the engine dilution may decrease a power output of the engine. Further, the engine temperature (plot 510) increases above the threshold engine temperature (dashed line 522), indicating that the engine is no longer in a cold-start condition. As a result of these operating conditions, the cylinder operates in the first pre-chamber EGR mode to increase cylinder dilution, as outlined in method 200 of FIG. 2. As such, the first pre-chamber AFR is stoichiometric (plot 504), and the pre-chamber EGR increases cylinder dilution without significantly affecting ignitibility of a cylinder air-fuel mixture or cylinder air-charge. Because the pre-chamber EGR does not include unburnt air and/or unburnt fuel while operating with the first pre-chamber EGR mode, the cylinder fuel amount (plot 506) remains the same as the cylinder fuel amount without pre-chamber EGR (dashed line 516).

Between time t1 and time t2, the external EGR valve position (plot 512) begins to increase from the fully closed position to a more open position due to a request for increased cylinder dilution. At time t2, the external EGR valve position (plot 512) increases above the threshold external EGR valve position (dashed line 524). The threshold external EGR valve position corresponds to a rate of EGR that may reduce combustion stability. As a result of the external EGR valve position, the pre-chamber transitions to the second pre-chamber EGR mode (plot 502) at time t2. The second pre-chamber EGR mode is calibrated to increase ignitibility in the cylinder, such as to compensate for the additional cylinder dilution from external EGR. As such, the first pre-chamber AFR decreases to an AFR rich relative to stoichiometry at time t2 (plot 504) in order to increase an amount of $H_2$ and unburnt fuel in the pre-chamber EGR. Because additional unburnt fuel is delivered to the cylinder via the pre-chamber EGR, the cylinder fuel amount is adjusted to a lower fuel amount (plot 506).

Between time t2 and time t3, the engine load (plot 508) increases in order to meet an increasing torque demand (plot 514) but remains below the first, upper threshold engine load (dashed line 518). Due to the increasing load, the amount of EGR provided begins to decrease, as shown by the external EGR valve getting adjusted to a further closed position (plot 512). At time t3, the external EGR valve position (plot 512) decreases below the threshold external EGR valve position (dashed line 524). In response, the pre-chamber transitions back to the first pre-chamber EGR mode (plot 502) and operates at stoichiometry for producing the pre-chamber EGR (plot 504). As a result, the cylinder fuel amount (plot 506) is equal to the cylinder fuel amount without pre-chamber EGR (dashed line 516).

At time t4, the engine load (plot 508) increases above the first, upper threshold engine load (dashed line 518) in order to meet the still increasing torque demand (plot 514). In response to the engine load increasing about the upper threshold engine load, no pre-chamber for EGR is provided (plot 502), and the cylinder fuel amount (plot 506) remains the same as the cylinder fuel amount without pre-chamber EGR (dashed line 516). For example, an air-fuel mixture may not be produced in the pre-chamber and ignited an intake valve closing.

At time t5, the demanded torque (plot 514) increases above the threshold demanded torque (plot 526). As a result, the pre-chamber operates in the third pre-chamber EGR mode (plot 502). As such, the pre-chamber operates with a lean pre-chamber AFR for producing EGR (plot 504), and the cylinder fueling is adjusted to compensate for additional air in the pre-chamber EGR (plot 506). Further, the pre-chamber AFR (plot 504) is highly lean (e.g., substantially all unburnt air). As such, the controller may increase the amount of $O_2$ in the pre-chamber EGR by injecting $O_2$ while not injecting fuel and not actuating the spark plug to provide the first combustion event during each combustion cycle. Thus, the pre-chamber EGR includes substantially all unburnt air and flows from the pre-chamber into the cylinder during each combustion cycle, increasing the cylinder air-charge. The cylinder fuel amount increases at time t5 to maintain cylinder stoichiometry with the increase cylinder air-charge (plot 506). After time t5, the first pre-chamber AFR is adjusted to several different lean pre-chamber AFRs (plot 504) in response to decreases in engine load and engine temperature. Further, the cylinder fuel amount is adjusted according to the changing pre-chamber AFR (plot 506).

In this way, a cylinder with a pre-chamber system may be operated to provide internal EGR (e.g., pre-chamber EGR) to a cylinder by combusting an air-fuel mixture, and cylinder combustion qualities may be adjusted during a combustion cycle. The pre-chamber EGR may include a mixture of unburnt air, unburnt fuel, and inert exhaust gas, with a desired composition of the pre-chamber EGR adjusted based on engine operating conditions (e.g., engine load, engine temperature, and an external EGR setting) in order to produce a desired effect on combustion in the cylinder. Further, the pre-chamber gases (e.g., the pre-chamber EGR and other gases purged from the pre-chamber) may be proactively adjusted based on a desired AFR in the cylinder, or cylinder fueling may be adjusted based on the pre-chamber gases in order to maintain the desired AFR in the cylinder. By adjusting the combustion qualities of the cylinder via fast-acting pre-chamber EGR, a fuel efficiency and/or a combustion stability of the cylinder may be increased. As another example, adjusting the combustion qualities of the cylinder via pre-chamber EGR may increase a power output and a burn rate of the cylinder. Overall, providing pre-chamber EGR via a pre-chamber combustion event may increase customer satisfaction and pre-chamber reliability relative to engine systems without pre-chamber EGR.

The technical effect of providing EGR from a pre-chamber to a cylinder is that the gas composition of the EGR may be adjusted for each combustion cycle, thereby adjusting combustion qualities in the cylinder such as ignitibility, burn rate, and air charge.

As one example, a method comprises: flowing gases from a pre-chamber to a cylinder of an engine prior to fueling the cylinder during a combustion cycle; adjusting a composition of the gases by adjusting at least one of an air injection amount to the pre-chamber and a fuel injection amount to the pre-chamber; and igniting an air-fuel mixture in the cylinder via a pre-chamber ignition event, the air-fuel mixture in the cylinder including the gas from the pre-chamber. In the preceding example, additionally or optionally, the pre-chamber is fluidically coupled to the cylinder via an opening in a wall of the pre-chamber. In one or both of the preceding examples, additionally or optionally, adjusting the composition of the gases includes determining a desired composition of the gases based on at least one of a temperature of the engine, engine load, a demanded amount of torque, and an amount of external exhaust gas recirculation (EGR) provided to the engine. In any or all of the preceding examples, additionally or optionally, adjusting the composition of the gases by adjusting at least one of the air injection amount to the pre-chamber and the fuel injection amount to the pre-chamber further includes determining a desired air-fuel ratio for a pre-chamber combustion event based on the desired composition of the gases, and the method further comprises: determining the air injection amount and the fuel injection amount based on the desired air-fuel ratio for the pre-chamber combustion event; and actuating a spark plug coupled to the pre-chamber after injecting the determined air injection amount to the pre-chamber and injecting the determined fuel injection amount to the pre-chamber and prior to fueling the cylinder. In any or all of the preceding examples, additionally or optionally, the pre-chamber combustion event is earlier in the combustion cycle than the pre-chamber ignition event, the combustion cycle beginning with an intake stroke of the cylinder. In any or all of the preceding examples, additionally or optionally, the desired air-fuel ratio for the pre-chamber combustion event is stoichiometry responsive to the engine load being between a lower threshold load and an upper threshold load and the temperature of the engine being greater than a threshold temperature, the desired air-fuel ratio for the pre-chamber combustion event is lean responsive to the demanded amount of torque being greater than a threshold, and the desired air-fuel ratio is rich responsive to at least one of the amount of external EGR provided to the engine being greater than a threshold amount and the temperature of the engine being less than the threshold temperature. In any or all of the preceding examples, additionally or optionally, the desired composition is unburnt air responsive to the demanded amount of torque being greater than a threshold, and adjusting the composition of the gases by adjusting at least one of the air injection amount to the pre-chamber and the fuel injection amount to the pre-chamber includes adjusting the fuel injection amount to zero. In any or all of the preceding examples, additionally or optionally, flowing the gas from the pre-chamber to the cylinder includes performing a purge air injection in the pre-chamber. In any or all of the preceding examples, additionally or optionally, igniting the air-fuel mixture in the cylinder via the pre-chamber ignition event includes, after performing the purge air injection: providing an ignition air injection amount to the pre-chamber and an ignition fuel injection amount to the pre-chamber; fueling the cylinder; and actuating a spark plug coupled to the pre-chamber.

As another example, a method comprises: while operating in a first mode, adjusting a composition of pre-chamber gases purged to a cylinder based on a desired air-fuel ratio of the cylinder; and while operating in a second mode, adjusting a fuel injection amount of the cylinder based on the composition of the pre-chamber gases purged to the cylinder and the desired air-fuel ratio of the cylinder. In the preceding examples, additionally or optionally, the pre-chamber gases include one or more of pre-chamber air, pre-chamber fuel, and pre-chamber combustion gases from a previous combustion event in the pre-chamber; and the composition of the pre-chamber gases includes a relative proportion of each of the pre-chamber air, the pre-chamber fuel, and the pre-chamber combustion gases from the previous combustion event in the pre-chamber in the pre-chamber gases purged to the cylinder. In one or both of the preceding examples, additionally or optionally, while operating in the first mode, adjusting the composition of the pre-chamber gases purged to the cylinder based on the desired air-fuel ratio of the cylinder includes adjusting the relative proportion to include substantially only the pre-chamber combustion gases from the previous combustion event in the pre-chamber. In any or all of the preceding examples, additionally or optionally, while operating in the first mode, adjusting the composition of the pre-chamber gases purged to the cylinder based on the desired air-fuel ratio of the cylinder includes adjusting at least one of an air injection amount and a fuel injection amount to the pre-chamber for the previous combustion event in the pre-chamber based on the desired air-fuel ratio of the cylinder. In any or all of the preceding examples, additionally or optionally, adjusting at least one of the air injection amount and the fuel injection amount to the pre-chamber for the previous combustion event in the pre-chamber based on the desired air-fuel ratio of the cylinder includes at least one of increasing the air injection amount as the desired air-fuel ratio of the cylinder increases, decreasing the fuel injection amount as the desired air-fuel ratio of the cylinder increases, increasing the fuel injection amount as the desired air-fuel ratio of the cylinder decreases, and decreasing the air injection amount as the desired air-fuel ratio of the cylinder decreases. In any or all of the preceding examples, additionally or optionally, while operating in the second mode, adjusting the fuel injection amount of the cylinder based on the composition of the pre-chamber gases purged to the cylinder and the desired air-fuel ratio of the cylinder includes: increasing the fueling to the cylinder as an amount of pre-chamber air increases; decreasing the fueling to the cylinder as an amount of pre-chamber fuel increases; and decreasing the fueling to the cylinder as an amount of pre-chamber exhaust gas increases.

As yet another example, a system comprises: an engine including a cylinder, the cylinder including and a pre-chamber of a pre-chamber ignition system; and a controller storing executable instructions in non-transitory memory that, when executed, cause the controller to: responsive to conditions for pre-chamber exhaust gas recirculation (EGR) being met, perform an EGR combustion event in the pre-chamber prior to fueling the cylinder and an ignition combustion event in the pre-chamber after fueling the cylinder during a single combustion cycle; and responsive to the conditions for pre-chamber EGR not being met, perform only the ignition combustion event in the pre-chamber during the single combustion cycle. In the preceding example, additionally or optionally, the conditions for pre-chamber EGR include conditions for operating in one of a first pre-chamber EGR mode, a second pre-chamber EGR mode, and a third pre-chamber EGR mode being met. In one or both of the preceding examples, additionally or optionally, the conditions for operating in the first pre-chamber EGR mode include conditions for increasing a dilution of the engine, the conditions for operating in the second pre-chamber EGR mode include conditions for increasing a combustion stability of the cylinder, and conditions for operating in the third pre-chamber EGR mode include conditions for increasing a power output of the cylinder. In any or all of the preceding examples, additionally or optionally, the pre-chamber includes a pre-chamber air injector, a pre-chamber fuel injector, and a pre-chamber spark plug coupled thereto, and, to perform the EGR combustion event in the pre-chamber prior to fueling the cylinder, the controller includes further instructions stored in non-transitory memory that, when executed, cause the controller to: inject an amount of air via the pre-chamber air injector and inject an amount of fuel via the pre-chamber fuel injector near an end of an intake stroke of the cylinder and prior to an intake valve of the cylinder closing, the amount of air and the amount of fuel each determined based on a desired air-fuel ratio of the pre-chamber EGR; and actuate the pre-chamber spark plug responsive to the intake valve of the cylinder closing. In any or all of the preceding examples, additionally or optionally, the desired air-fuel ratio of the pre-chamber EGR is stoichiometry while operating in the first pre-chamber EGR mode, the desired air-fuel ratio of the pre-chamber is rich while operating in the second pre-chamber EGR mode, and the desired air-fuel ratio of the cylinder is lean while operating in the third pre-chamber EGR mode.

In another representation, a method comprises: determining an amount of gases purged from a pre-chamber to a cylinder based on a pressure difference between the pre-chamber and the cylinder during purging; and adjusting fueling to the cylinder based on the amount of gases purged from the pre-chamber to the cylinder. In the preceding example, the method additionally or optionally further comprises determining a composition of the gases purged from the pre-chamber to the cylinder based in part on parameters of a previous pre-chamber combustion event, and the purging includes actuating an air injector of the pre-chamber during a compression stroke of the cylinder. In one or both of the preceding examples, additionally or optionally, the composition includes at least one of pre-chamber air, pre-chamber fuel, and pre-chamber exhaust gas, and adjusting the fueling to the cylinder includes: increasing the fueling to the cylinder as an amount of pre-chamber air increases; decreasing the fueling to the cylinder as an amount of pre-chamber fuel increases; and decreasing the fueling to the cylinder as an amount of pre-chamber exhaust gas increases. In any or all of the preceding examples, additionally or optionally, the previous pre-chamber combustion event is a pre-chamber EGR combustion event for providing internal EGR to the cylinder during a compression stroke of the cylinder. In any or all of the preceding examples, additionally or optionally, the previous pre-chamber combustion event is a pre-chamber ignition combustion event for providing pre-chamber ignition to the cylinder during a previous combustion cycle. In any or all of the preceding examples, additionally or optionally, the parameters of the previous pre-chamber combustion event include a pre-chamber fuel injection pressure, a pre-chamber fuel injection amount, a pre-chamber air injection pressure, a pre-chamber air injection amount, and a pre-chamber spark timing. In any or all of the preceding examples, additionally or optionally, the pressure difference between the pre-chamber and the cylinder during the purging is determined based on an injection pressure of an air injector of the pre-chamber and a piston position of the cylinder, and the injection pressure of the air injector is at least above a peak pressure of the cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   flowing gases from a pre-chamber to a cylinder of an engine prior to fueling the cylinder during a combustion cycle;
   adjusting a composition of the gases by adjusting at least one of an air injection amount to the pre-chamber and a fuel injection amount to the pre-chamber; and
   igniting an air-fuel mixture in the cylinder via a pre-chamber ignition event, the air-fuel mixture in the cylinder including the gas from the pre-chamber.

2. The method of claim 1, wherein the pre-chamber is fluidically coupled to the cylinder via an opening in a wall of the pre-chamber.

3. The method of claim 1, wherein adjusting the composition of the gases includes determining a desired composition of the gases based on at least one of a temperature of the engine, engine load, a demanded amount of torque, and an amount of external exhaust gas recirculation (EGR) provided to the engine.

4. The method of claim 3, wherein adjusting the composition of the gases by adjusting at least one of the air injection amount to the pre-chamber and the fuel injection amount to the pre-chamber further includes determining a desired air-fuel ratio for a pre-chamber combustion event based on the desired composition of the gases, and the method further comprises:
   determining the air injection amount and the fuel injection amount based on the desired air-fuel ratio for the pre-chamber combustion event; and
   actuating a spark plug coupled to the pre-chamber after injecting the determined air injection amount to the pre-chamber and injecting the determined fuel injection amount to the pre-chamber and prior to fueling the cylinder.

5. The method of claim 4, wherein the pre-chamber combustion event is earlier in the combustion cycle than the pre-chamber ignition event, the combustion cycle beginning with an intake stroke of the cylinder.

6. The method of claim 4, wherein the desired air-fuel ratio for the pre-chamber combustion event is stoichiometry responsive to the engine load being between a lower threshold load and an upper threshold load and the temperature of the engine being greater than a threshold temperature, the desired air-fuel ratio for the pre-chamber combustion event is lean responsive to the demanded amount of torque being greater than a threshold, and the desired air-fuel ratio is rich responsive to at least one of the amount of external EGR provided to the engine being greater than a threshold amount and the temperature of the engine being less than the threshold temperature.

7. The method of claim 3, wherein the desired composition is unburnt air responsive to the demanded amount of torque being greater than a threshold, and adjusting the composition of the gases by adjusting at least one of the air injection amount to the pre-chamber and the fuel injection amount to the pre-chamber includes adjusting the fuel injection amount to zero.

8. The method of claim 1, wherein flowing the gas from the pre-chamber to the cylinder includes performing a purge air injection in the pre-chamber.

9. The method of claim 8, wherein igniting the air-fuel mixture in the cylinder via the pre-chamber ignition event includes, after performing the purge air injection:
   providing an ignition air injection amount to the pre-chamber and an ignition fuel injection amount to the pre-chamber;
   fueling the cylinder; and
   actuating a spark plug coupled to the pre-chamber.

10. A method, comprising:
    while operating in a first mode, adjusting a composition of pre-chamber gases purged to a cylinder based on a desired air-fuel ratio of the cylinder; and
    while operating in a second mode, adjusting a fuel injection amount of the cylinder based on the composition of the pre-chamber gases purged to the cylinder and the desired air-fuel ratio of the cylinder.

11. The method of claim 10, wherein:
    the pre-chamber gases include one or more of pre-chamber air, pre-chamber fuel, and pre-chamber combustion gases from a previous combustion event in the pre-chamber; and
    the composition of the pre-chamber gases includes a relative proportion of each of the pre-chamber air, the pre-chamber fuel, and the pre-chamber combustion gases from the previous combustion event in the pre-chamber in the pre-chamber gases purged to the cylinder.

12. The method of claim 11, wherein, while operating in the first mode, adjusting the composition of the pre-chamber gases purged to the cylinder based on the desired air-fuel ratio of the cylinder includes adjusting the relative proportion to include substantially only the pre-chamber combustion gases from the previous combustion event in the pre-chamber.

13. The method of claim 11, wherein, while operating in the first mode, adjusting the composition of the pre-chamber gases purged to the cylinder based on the desired air-fuel ratio of the cylinder includes adjusting at least one of an air injection amount and a fuel injection amount to the pre-chamber for the previous combustion event in the pre-chamber based on the desired air-fuel ratio of the cylinder.

14. The method of claim 13, wherein adjusting at least one of the air injection amount and the fuel injection amount to the pre-chamber for the previous combustion event in the pre-chamber based on the desired air-fuel ratio of the cylinder includes at least one of increasing the air injection amount as the desired air-fuel ratio of the cylinder increases, decreasing the fuel injection amount as the desired air-fuel ratio of the cylinder increases, increasing the fuel injection amount as the desired air-fuel ratio of the cylinder decreases, and decreasing the air injection amount as the desired air-fuel ratio of the cylinder decreases.

15. The method of claim 11, wherein, while operating in the second mode, adjusting the fuel injection amount of the cylinder based on the composition of the pre-chamber gases purged to the cylinder and the desired air-fuel ratio of the cylinder includes:
  increasing the fueling to the cylinder as an amount of pre-chamber air increases;
  decreasing the fueling to the cylinder as an amount of pre-chamber fuel increases; and
  decreasing the fueling to the cylinder as an amount of pre-chamber exhaust gas increases.

16. A system, comprising:
  an engine including a cylinder, the cylinder including and a pre-chamber of a pre-chamber ignition system; and
  a controller storing executable instructions in non-transitory memory that, when executed, cause the controller to:
    responsive to conditions for pre-chamber exhaust gas recirculation (EGR) being met, perform an EGR combustion event in the pre-chamber prior to fueling the cylinder and an ignition combustion event in the pre-chamber after fueling the cylinder during a single combustion cycle; and
    responsive to the conditions for pre-chamber EGR not being met, perform only the ignition combustion event in the pre-chamber during the single combustion cycle.

17. The system of claim 16, wherein the conditions for pre-chamber EGR include conditions for operating in one of a first pre-chamber EGR mode, a second pre-chamber EGR mode, and a third pre-chamber EGR mode being met.

18. The system of claim 17, wherein the conditions for operating in the first pre-chamber EGR mode include conditions for increasing a dilution of the engine, the conditions for operating in the second pre-chamber EGR mode include conditions for increasing a combustion stability of the cylinder, and conditions for operating in the third pre-chamber EGR mode include conditions for increasing a power output of the cylinder.

19. The system of claim 17, wherein the pre-chamber includes a pre-chamber air injector, a pre-chamber fuel injector, and a pre-chamber spark plug coupled thereto, and, to perform the EGR combustion event in the pre-chamber prior to fueling the cylinder, the controller includes further instructions stored in non-transitory memory that, when executed, cause the controller to:
  inject an amount of air via the pre-chamber air injector and inject an amount of fuel via the pre-chamber fuel injector near an end of an intake stroke of the cylinder and prior to an intake valve of the cylinder closing, the amount of air and the amount of fuel each determined based on a desired air-fuel ratio of the pre-chamber EGR; and
  actuate the pre-chamber spark plug responsive to the intake valve of the cylinder closing.

20. The system of claim 19, wherein the desired air-fuel ratio of the pre-chamber EGR is stoichiometry while operating in the first pre-chamber EGR mode, the desired air-fuel ratio of the pre-chamber is rich while operating in the second pre-chamber EGR mode, and the desired air-fuel ratio of the cylinder is lean while operating in the third pre-chamber EGR mode.

* * * * *